United States Patent [19]

Archie, Jr. et al.

[11] 4,299,895
[45] Nov. 10, 1981

[54] PHOTOGRAPHIC ELEMENTS CONTAINING POLYMERS WHICH COORDINATE WITH METAL IONS

[75] Inventors: William C. Archie, Jr.; Gerald A. Campbell, both of Rochester, N.Y.

[73] Assignee: Eastman Kodak Company, Rochester, N.Y.

[21] Appl. No.: 102,099

[22] Filed: Dec. 10, 1979

Related U.S. Application Data

[62] Division of Ser. No. 944,477, Sep. 21, 1978, Pat. No. 4,239,847.

[51] Int. Cl.³ .................... G03C 1/40; G03C 5/54
[52] U.S. Cl. .................... 430/17; 430/213; 430/214; 430/215; 430/223
[58] Field of Search ............... 430/213, 215, 223, 17, 430/214

[56] References Cited

U.S. PATENT DOCUMENTS

| | | | |
|---|---|---|---|
| 2,774,668 | 12/1956 | Rogers | 430/222 |
| 3,075,841 | 1/1963 | Lehman et al. | 430/213 |
| 3,081,167 | 3/1963 | Goulston | 430/225 |
| 3,196,014 | 7/1965 | Rogers | 430/225 |
| 3,619,155 | 11/1971 | Young | 430/214 |
| 3,709,693 | 1/1973 | Bloom et al. | 430/222 |
| 4,142,891 | 6/1979 | Baigrie et al. | 430/223 |

FOREIGN PATENT DOCUMENTS

| | | |
|---|---|---|
| 905701 | 9/1962 | United Kingdom . |
| 1121995 | 7/1968 | United Kingdom . |

*Primary Examiner*—Richard L. Schilling
*Attorney, Agent, or Firm*—Arthur H. Rosenstein

[57] ABSTRACT

A photographic element comprising a support, a layer containing an image dye ligand or dye ligand forming material and a layer containing a dye mordant, wherein the mordant layer has associated therewith:
 (1) a polymer containing groups which form coordination complexes with metal ions; and
 (2) a source of metal ions.

The polymer holds the metal ions in the vicinity of the dye mordant so that the metal ions can metallize the dye or dye forming material at the image receiving layer. These complexes, elements, and receiving elements are particularly useful in diffusion transfer processes. Novel polymers are also described.

14 Claims, No Drawings

PHOTOGRAPHIC ELEMENTS CONTAINING POLYMERS WHICH COORDINATE WITH METAL IONS

This is a division of application Ser. No. 944,477, filed Sept. 21, 1978, U.S. Pat. No. 4,239,897, issued Dec. 16, 1980.

The present invention relates to novel photographic elements containing polymers which coordinate with metal ions to form complexes.

The use of various dyes and dye forming materials in photographic processes and particularly in image transfer processes has been known for quite some time. In many cases, however, dye image stability has been a problem in that the dyes may tend to wander from the image receiving layer after processing, the dyes may be destroyed in dark reactions and, additionally, the image fades due to exposure to light over a period of time.

The use of metal complexes of some ortho substituted azo dyes in image transfer processes reduces fade as these metallized dyes have been found to be extremely light resistant.

Premetallized dyes are described in U.S. Pat. Nos. 3,081,167, 3,196,014 and British Pat. Nos. 905,701 and 1,121,995 wherein dye developers, preferably premetallized, are coated in the image-forming element of an image transfer film unit and are released as a function of exposure and development. The released dye developers then diffuse to an image receiving layer. In some instances, a metallic salt or complex can be in a receiving layer and the dye or dye forming material can be metallizable rather than premetallized. That is, the dye or dye forming material contains groups which will chelate with the metal ions to form the metallized dyes in the receiver.

It has been found that the metallizable dye approach has the advantages of faster diffusion than the premetallized dye approach in most cases and of the ability to use the metallization step as a dye hue shifting mechanism. The use of a metallizable dye or dye former, however, requires the use of a metallizing image receiving layer. However, metal ions coated in the receiving layer tend to wander which causes deleterious sensitometric effects in the light-sensitive emulsion layer. There can also be an increase in access time for viewing the transfer image due to premature metallization of the dyes in layers other than the receiving layer.

It is advantageous to shift dye hues in color image transfer film units when the image dyes absorb radiation in the regions of the spectrum to which the silver halide being used is sensitive. In these cases, when the dye hues are not shifted, a loss of photographic speed results.

It has been found that a photographic element and particularly a color image transfer film unit which comprises (1) a support,
(2) a metallizable dye (dye ligand) or metallizable dye ligand forming material (one which forms a metallizable dye), and
(3) a mordant-containing receiving layer, said mordant-containing receiving layer having associated therewith
    (a) a polymer containing ligand groups which form coordination complexes with metal ions, and
    (b) a source of said metal ions associated with said polymer, effectively prevents the diffusion of metal ions throughout the film unit but still rapidly metallizes the image dye forming material in the vicinity of the mordant to provide a dye image with improved light stability.

A photographic element in accordance with our invention comprises a support, at least one layer containing a dye mordant and at least one layer containing a dye ligand or dye ligand forming material, wherein the layer containing the dye mordant has associated therewith:

(a) a polymer containing ligand groups which form coordination complexes with metal ions; and
(b) metal ions, wherein the stability constant of a complex of the polymer and metal ion is at least $10^{10}$.

Our invention also comprises a novel composition comprising:

(a) a polymer comprising from about 5 to 100 weight percent of the recurring units having the structure:

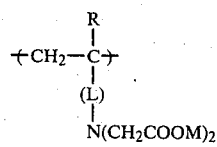

wherein R is H, halogen or an alkyl group containing from 1 to 6 carbon atoms, L is a bivalent linking group and M is selected from the group consisting of H, an ammonium cation and an alkali metal ion; and
(b) metal ions.

Further, in accordance with our invention, a novel metal complex comprises metal ions with a polymer comprising from about 5 to 100 weight percent of the recurring units having the structure:

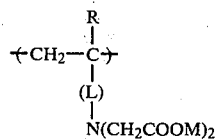

wherein R is H, halogen or an alkyl group containing from 1 to 6 carbon atoms, L is a bivalent linking group and M is selected from the group consisting of H, an ammonium cation and an alkali metal ion.

Still further, in accordance with our invention, an image receiving element comprises a support having thereon at least one layer comprising a mordant and a metallized dye, said element containing either in the mordant layer or in a layer intervening the support and mordant layer a metal complex of metal ions with a polymer comprising from about 5 to 100 weight percent of the recurring units having the structure:

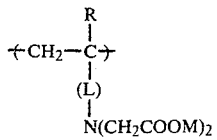

wherein R is H, halogen or an alkyl group containing from 1 to 6 carbon atoms, L is a bivalent linking group and M is selected from the group consisting of H, an ammonium cation and an alkali metal ion.

Basically, any mordant for the dyes or dye formers may be used in the image receiving layer as long as the desired function or mordanting or otherwise fixing the dye images will be obtained. The particular material chosen will, of course, depend on the dye or dye forming material to be mordanted. Suitable materials are disclosed on pages 80 through 82 of the November, 1976 edition of *Research Disclosure*, the disclosure of which is hereby incorporated by reference. Although in most instances the mordant will be a separate material to bind the dyes, in some instances a polymeric mordant can be formed by copolymerizing a monomeric mordant with a metal-coordinating monomer, or the polymer coordinating with the metal ions can itself be a mordant for the dyes and dye forming materials such as poly(vinylpyridine), poly(vinylimidazole), poly(ethyleneimine) partially quaternized poly(vinylpyridine) and poly(vinylimidazole) and the like.

The metallizable dye or dye forming material is one which contains ligand groups (any group which will donate a pair of electrons to a metal ion), a salt thereof or a hydrolyzable precursor thereof, such as an alkali metal salt or a quaternary ammonium salt of a chelating group or a hydrolyzable acyl group. Examples of these chelating groups include hydroxy, amino, carboxy, sulfonamido, sulfamoyl, a hydrolyzable acyl function having the formula —OCOR′, OCOOR′, —OCON(R′)$_2$ or —COOR′, wherein R′ is an alkyl group having 1 to about 4 carbon atoms, such as methyl, ethyl, isopropyl, butyl and the like, or an aryl group having 6 to about 8 carbon atoms such as phenyl, etc. Preferably, the dyes are multidentate ligands, i.e., they form chelates by coordinating with a metal ion on more than one site.

Generally, any ligand dye containing the above ligand chelating groups or material which can provide ligand chelating groups will be useful herein as the metallizable dye or dye forming material. Examples of such dyes are those dye developers described in U.S. Pat. Nos. 3,081,167 and 3,196,014 and British Pat. Nos. 905,701 and 1,121,995.

Useful image dye forming materials include redox dye releasers containing dye moieties containing the ligand groups or precursors therof. These dye forming materials are disclosed in copending U.S. application Ser. No. 822,188 filed Aug. 5, 1977 by B. D. Baigrie et al. The nondiffusible compounds having a releasable azo dye moiety generally can have the formula:

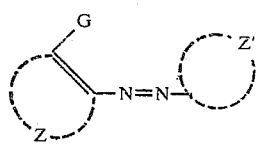

wherein:
Z represents the atoms necessary to complete an aromatic carbocyclic or heterocyclic nucleus having at least one ring of 5 to 7 atoms, such as phenyl, pyridyl, naphthyl, pyrazolyl, indolyl, etc.;
Z′ is an aromatic carbocyclic or heterocyclic nucleus having at least one ring of 5 to 7 atoms (e.g., the same nuclei as described above for Z), the Z′ having, in a position adjacent to the point of attachment to the azo linkage, either
  (a) a nitrogen atom in the ring of the nucleus which acts as a chelating site, or
  (b) a carbon atom in the ring of the nucleus having directly attached thereto a nitrogen atom, which acts as a chelating site;
G is a metal chelating group (any group which will donate a pair of electrons to a metal ion) or a salt thereof (e.g., an alkali metal salt, a quaternary ammonium salt, etc) or a hydrolyzable precursor thereof (e.g., a hydrolyzable acyl or ester group), e.g., hydroxy; amino; carboxy; sulfonamido; sulfamoyl; a hydrolyzable ester group having the formula —OCOR$^1$, —OCOOR$^1$, —OCON(R$^1$)$_2$ or —COOR$^1$, wherein R$^1$ is an alkyl group having 1 to about 4 carbon atoms, such as methyl, ethyl, isopropyl, butyl and the like, or an aryl group having 6 to about 8 carbon atoms, such as phenyl, etc; or a group which together with

is a ballasted carrier moiety (as defined below) which is attached to the Z-nucleus through the oxygen of the

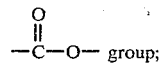 group;

the compound containing a ballasted carrier moiety capable of releasing the diffusible azo dye, under alkaline conditions, such as, for example, as a function (either direct or inverse) of development of the silver halide emulsion layer.

In the above formula, G can be either a monovalent group or a nitrogen atom as part of a heterocyclic ring fused to Z. In this later instance, the Z and G atoms can form a nucleus which is the same as the Z′ nucleus.

There is great latitude in selecting a carrier moiety which is attached to the azo dye-releasing compounds described above. Depending upon the nature of the ballasted carrier selected, various groups may be needed to attach or link the carrier moiety to the azo dye. Such linking groups are considered to be a part of the ballasted carrier moiety. It should also be noted that when the dye moiety is released from the compound, cleavage may take place in such a position that part or all of a linking group if one is present, and even part of ballasted moiety may be transferred to the image-receiving layer along with the dye moiety. In any event, the azo dye nucleus as shown above can be through of as the "minimum" which is transferred.

Ballasted carrier moieties useful herein are described in U.S. Pat. Nos. 3,227,550; 3,628,952; 3,227,552; and 3,844,785 (dye released by chromogenic coupling); U.S. Pat. Nos. 3,443,939 and 3,443,940 (dye released by intramolecular ring closure); U.S. Pat. Nos. 3,698,897 and 3,725,062 (dye released from hydroquinone derivatives); U.S. Pat. No. 3,728,113 (dye released from a hydroquinonylmethyl quaternary salt); U.S. Pat. Nos. 3,719,489 and 3,443,941 (silver ion induced dye release); and U.S. Pat. Nos. 3,245,789 and 3,980,497; Canadian Pat. No. 602,607; British Pat. No. 1,464,104; *Research Disclosure* 14447, April 1976; and U.S. Pat. No. 4,139,379 issued Feb. 13, 1979 of Chasman et al (dye released by miscellaneous mechanisms).

In a further embodiment, the ballasted carrier moiety or CAR as described above may be represented by the following formula:

(Ballast—Carrier—Link)— wherein:
(a) Ballast is an organic ballasting radical of such molecular size and configuration as to render the compound nondiffusible in a photographic element during development in an alkaline processing composition;
(b) Carrier is an oxidizable acyclic, carbocyclic or heterocyclic moiety (see "The Theory of the Photographic Process", by C. E. K. Mees and T. H. James, Third Edition, 1966, pages 282 to 283), e.g., moieties containing atoms according to the following configuration:

(a)—(C═C)—$_b$ wherein:
b is a positive integer of 1 to 2; and
a represents the radicals OH, SH, NHR' wherein R' is as earlier described, or hydrolyzable precursors thereof; and
(c) Link represents a group which upon oxidation of said Carrier moiety is capable of being hydrolytically cleaved to release the diffusible azo dye. For example, Link may be the following groups:

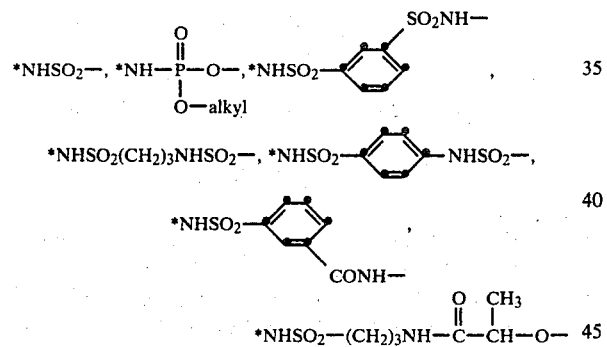

wherein * represents the position of attachment to Carrier.

The Ballast group in the above formula is not critical as long as it confers nondiffusibility to the compound. Typical Ballast groups include long-chain alkyl radicals linked directly or indirectly to the compound as well as aromatic radicals of the benzene and naphthalene series indirectly attached or fused directly to the carbocyclic or heterocyclic nucleus, etc. Useful Ballast groups generally have at least 8 carbon atoms such as substituted or unsubstituted alkyl groups of 8 to 22 carbon atoms, a carbamoyl radical having 8 to 30 carbon atoms such as —CONH(CH$_2$)$_4$—O—C$_6$H$_3$(C$_5$H$_{11}$)$_2$, —CON(C$_{12}$H$_{25}$)$_2$, etc., a keto radical having 8 to 30 carbon atoms such as —CO—C$_{17}$H$_{35}$, —CO—C$_6$H$_4$-(t—C$_{12}$H$_{25}$), etc.

For specific examples of Ballast-Carrier-Link moieties useful as the CAR moiety in this invention, reference is made to the November 1976 edition of *Research Disclosure*, pages 68 through 74, and the April 1977 edition of *Research Disclosure*, pages 32 through 39, the disclosures of which are hereby incorporated by reference.

In a highly preferred embodiment of the invention, the ballasted carrier moiety or CAR in the above formulas is a group having the formula:

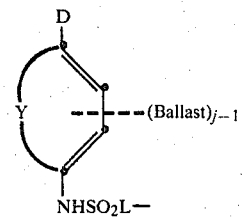

wherein:
(a) Ballast is an organic ballasting radical of such molecular size and configuration (e.g., simple organic groups or polymeric groups) as to render the compound nondiffusible in a photographic element during development in an alkaline processing composition;
(b) D is OR$^2$ or NHR$^3$ wherein R$^2$ is hydrogen or a hydrolyzable moiety and R$^3$ is hydrogen or a substituted or unsubstituted alkyl group of 1 to 22 carbon atoms such as methyl, ethyl, hydroxyethyl, propyl, butyl, secondary butyl, tert-butyl, cyclopropyl, 4-chlorobutyl, cyclobutyl, 4-nitroamyl, hexyl, cyclohexyl, octyl, decyl, octadecyl, dodecyl, benzyl, phenethyl, etc. (when R$^3$ is an alkyl group of greater than 8 carbon atoms, it can serve as a partial or sole Ballast);
(c) Y represents the atoms necessary to complete a benzene nucleus, a naphthalene nucleus, or a 5 to 7 membered heterocyclic ring such as pyrazolone, pyrimidine, etc;
(d) j is a positive integer of 1 to 2 and is 2 when D is OR$^2$ or when R$^3$ is hydrogen or an alkyl group of less than 8 carbon atoms; and
(e) L is a linking group which is [X—(NR$^4$—J)$_q$]$_m$— or X—J—NR$^4$— wherein:
  (i) X represents a bivalent linking group of the formula —R$^5$—L'$_n$—R$^5_p$— where each R$^5$ can be the same or different and each represents an alkylene radical having 1 to about 8 carbon atoms, such as methylene, hexylene and the like; a phenylene radical; or a substituted phenylene radical having 6 to about 9 carbon atoms, such as methoxy phenylene;
  (ii) L' represents a bivalent radical selected from oxy, carbonyl, carboxamido, carbamoyl, sulfonamido, ureylene, sulfamoyl, sulfinyl or sulfonyl;
  (iii) n is an integer of 0 or 1;
  (iv) p is 1 when n equals 1 and p is 1 or 0 when n equals 0, provided that when p is 1 the carbon content of the sum of both R$^5$ radicals does not exceed 14 carbon atoms;
  (v) R$^4$ represents a hydrogen atom, or an alkyl radical having 1 to about 6 carbon atoms;
  (vi) J represents a bivalent radical selected from sulfonyl or carbonyl;
  (vii) q represents an integer of 0 or 1; and
  (viii) m represents an integer of 0, 1 or 2.

Especially good results are obtained in the above formula when D is OH, j is 2, Y is a naphthalene nucleus, and G is OH.

Examples of the CAR moiety in this highly preferred embodiment are disclosed in U.S. Pat. Nos. 4,076,529; 3,928,312; French Pat. No. 2,284,140; and German Pat. Nos. 2,406,664; 2,613,005; and 2,505,248, the disclosures of which are hereby incorporated by reference, and include the following:

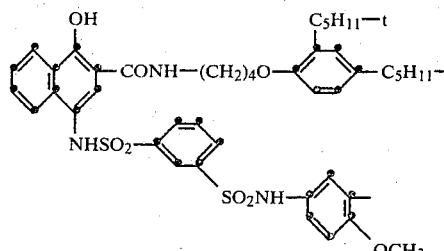

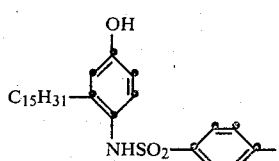

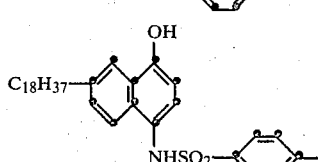

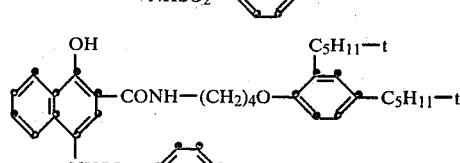

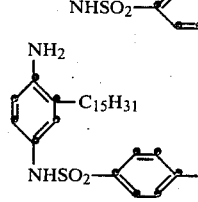

In another embodiment the ballasted carrier moiety or CAR in the above formulas is such that the diffusible azo dye is released as an inverse function of development of the silver halide emulsion layer under alkaline conditions. This is ordinarily referred to as positive-working dye-release chemistry. In one of these embodiments, the ballasted carrier moiety or CAR in the above formulas may be a group having the formula:

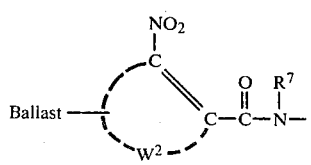

wherein:
Ballast is an organic ballasting radical of such molecular size and configuration as to render the compound nondiffusible in a photographic element during development in an alkaline processing composition;

$W^2$ represents at least the atoms necessary to complete a benzene nucleus (including various substituents thereon); and $R^7$ is an alkyl (including substituted alkyl such as benzyl and the like) radical preferably having 1 to about 4 carbon atoms.

Examples of this CAR moiety include the following:

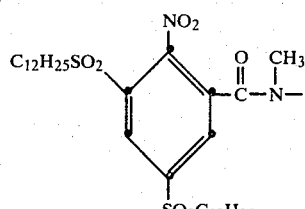

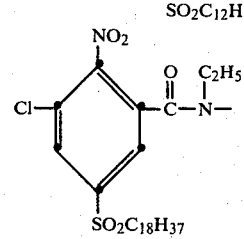

In a second embodiment of positive-working dye-release chemistry as referred to above, the ballasted carrier moiety or CAR in the above formulas may be a group having the formula:

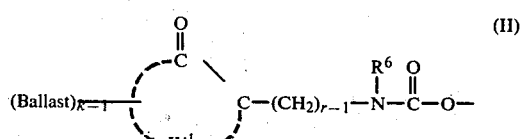

wherein:
Ballast is an organic ballasting radical of such molecular size and configuration as to render the compound nondiffusible in a photographic element during development in an alkaline processing composition;

$W^1$ represents at least the atoms necessary to complete a quinone nucleus (including various substituents thereon);

r is a positive integer of 1 or 2;

$R^6$ is an alkyl (including substituted alkyl) radical having 1 to about 40 carbon atoms or an aryl (including substituted aryl) radical having 6 to about 40 carbon atoms; and k is a positive integer of 1 to 2 and is 2 when $R^6$ is a radical of less than 8 carbon atoms.

Examples of the CAR moiety in formula II include the following:

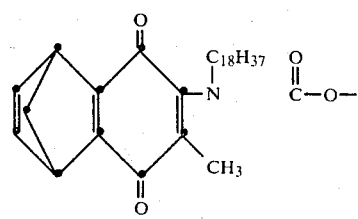

-continued

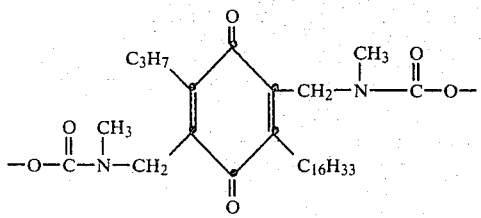

In using the compounds in formulas I and II above, they are employed in a photographic element similar to the other nondiffusible dye-releasers described previously. Upon reduction of the compound as a function of silver halide development under alkaline conditions, the metallizable azo dye is released. In this embodiment, conventional negative-working silver halide emulsions, as well as direct-positive emulsions, can be employed. For further details concerning these particular CAR moieties, including synthesis details, reference is made to U.S. Pat. No. 4,139,379 issued Feb. 13, 1979 of Chasman et al, the disclosure of which is hereby incorporated by reference.

In a third embodiment of positive-working dye-release chemistry as referred to above, the ballasted carrier moiety or CAR in the above formulas may be a group having the formula:

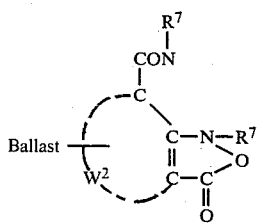

wherein: Ballast, $W^2$ and $R^7$ are as defined for formula I above.

Examples of the CAR moiety in formula III include the following:

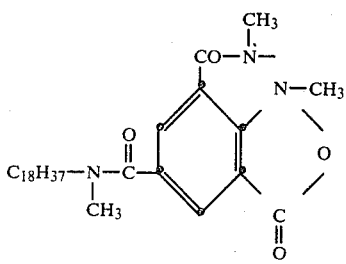

-continued

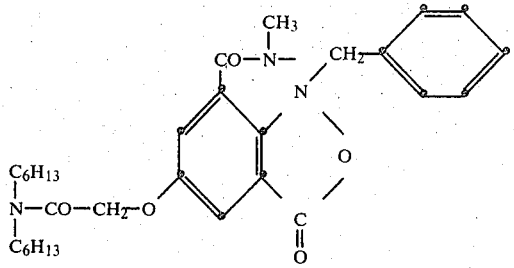

For further details concerning this particular CAR moiety, including synthesis details, reference is made to U.S. application Ser. No. 534,966 of Hinshaw et al, filed Dec. 20, 1974, the disclosure of which is hereby incorporated by reference.

In a fourth embodiment of positive-working dye-release chemistry as referred to above, the ballasted carrier moiety or CAR may be a group having the formula:

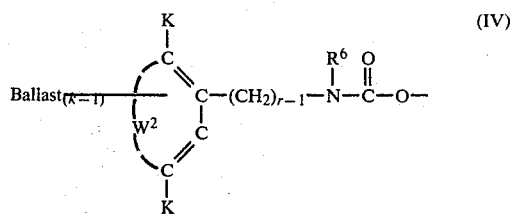

wherein:
Ballast, r, $R^6$ and k are as defined for formula II above;
$W^2$ is as defined for formula I above; and
K is OH or a hydrolyzable precursor thereof.
Examples of the CAR moiety in formula IV include the following:

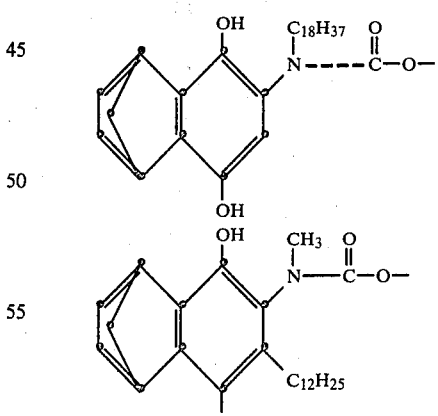

For further details concerning this particular CAR moiety, including synthesis details, reference is made to U.S. Pat. No. 3,980,479 of Fields et al, issued Sept. 14, 1976, the disclosure of which is hereby incorporated by reference.

Representative metallizable dye or dye forming compounds useful in the invention include the following:

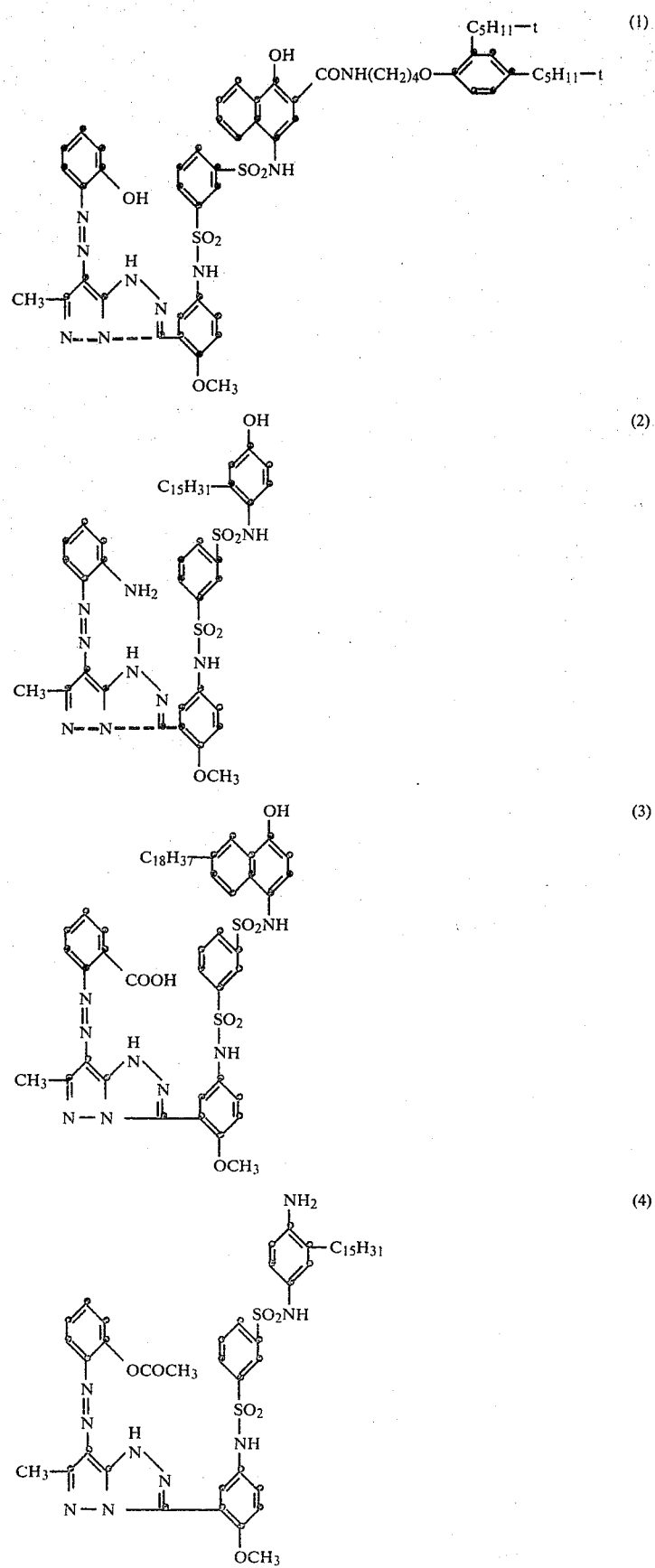

-continued
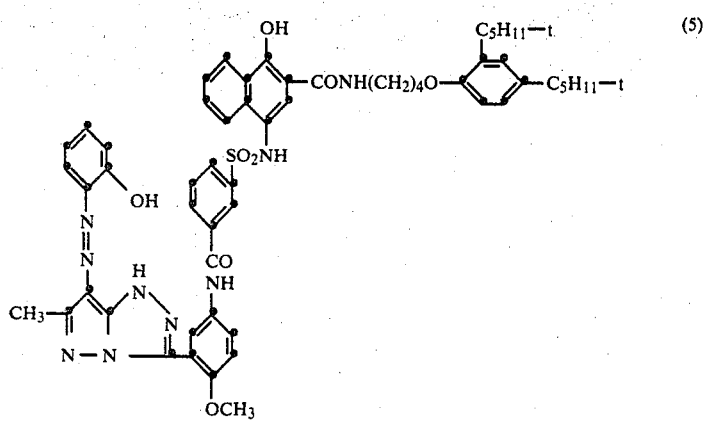
(5)
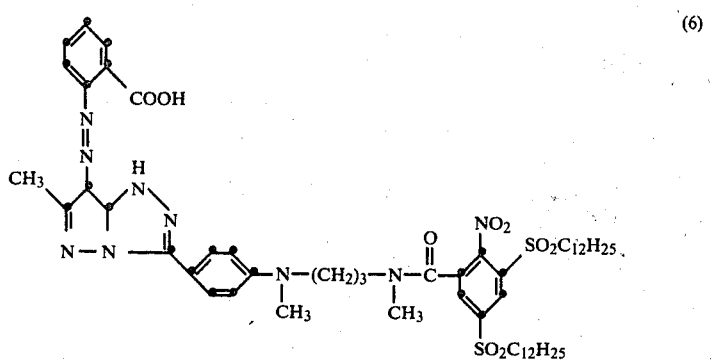
(6)
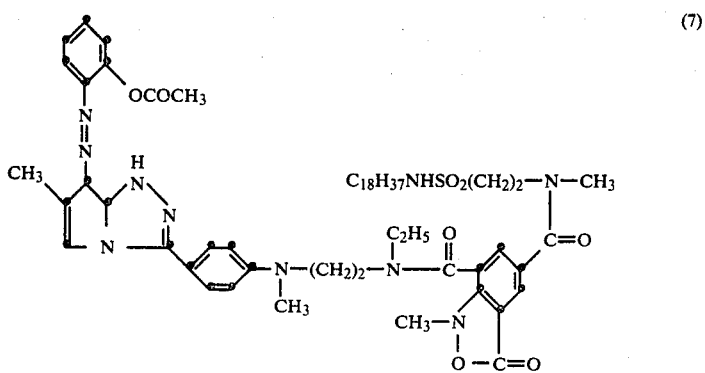
(7)
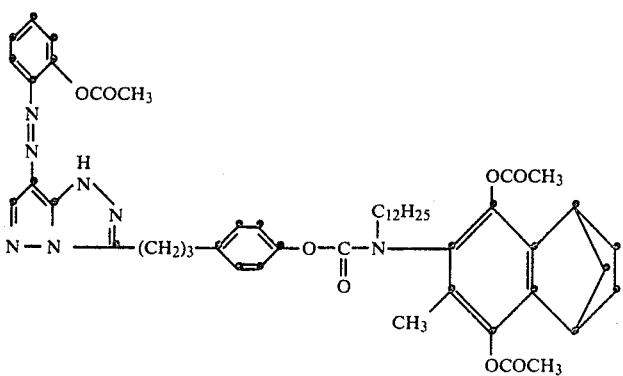
(8)

-continued
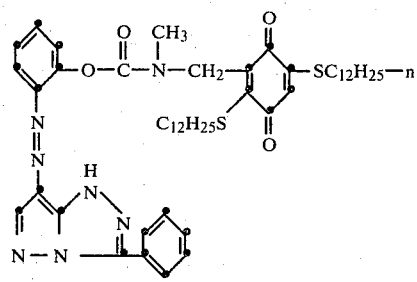
(9)
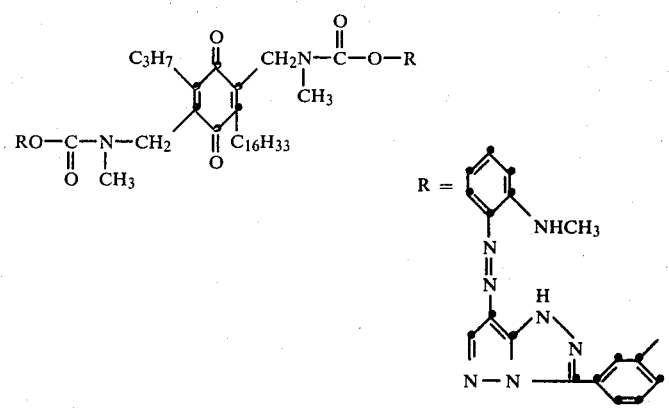
(10)
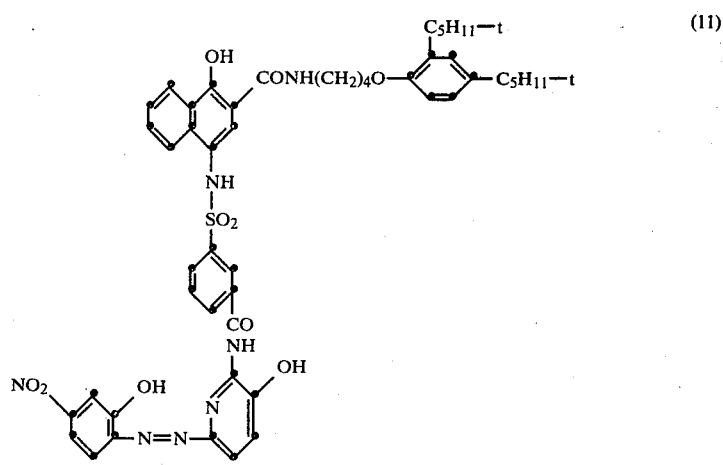
(11)
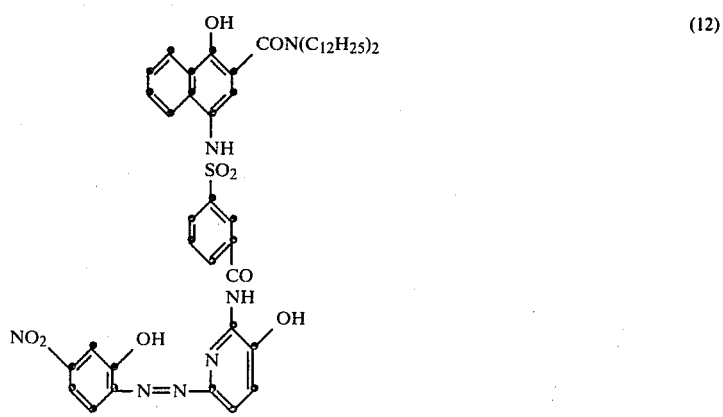
(12)

-continued
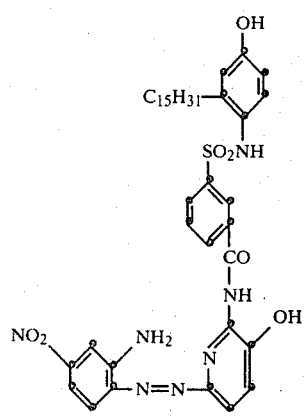
(13)
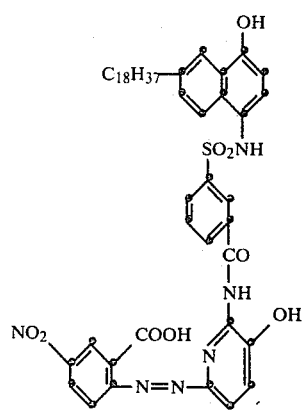
(14)
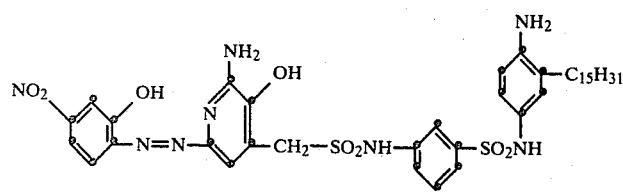
(15)
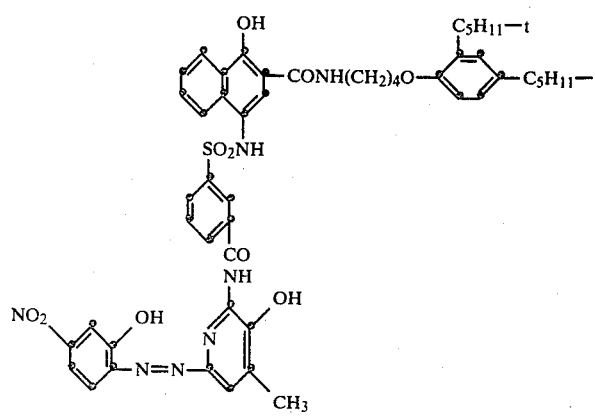
(16)
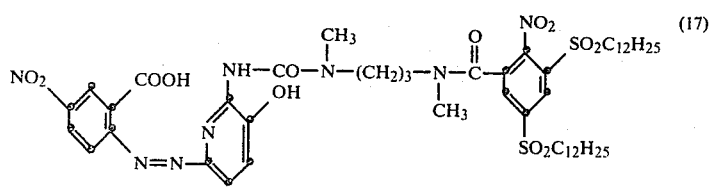
(17)

-continued
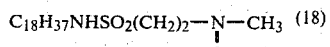
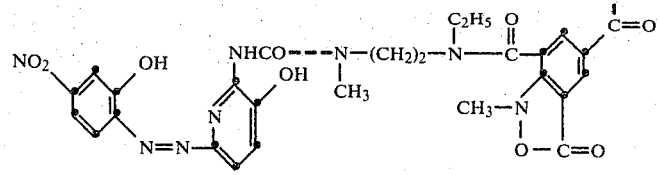
(18)
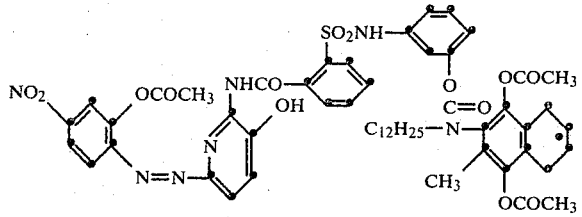
(19)
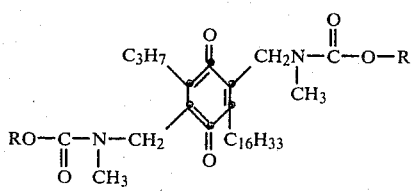
(20)
R =
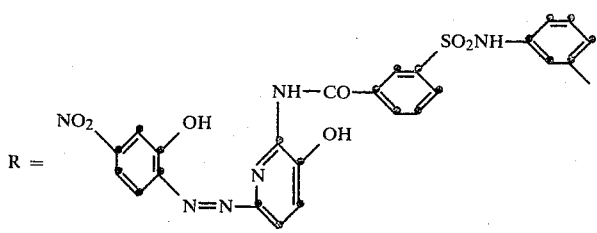
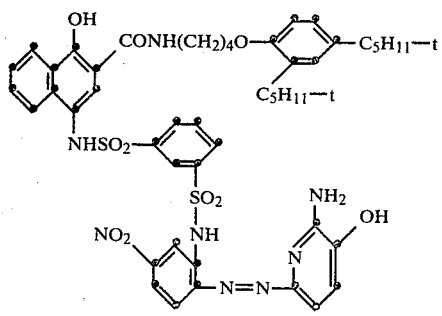
(21)
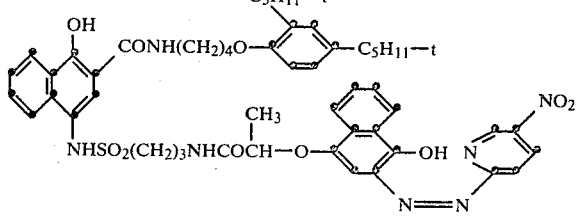
(22)
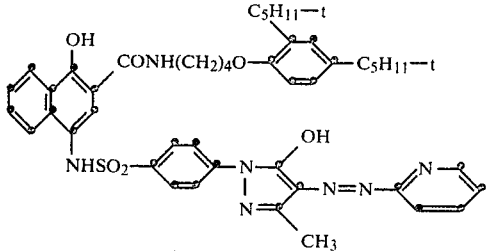
(23)

-continued

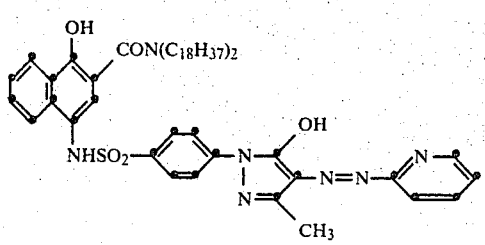
(24)

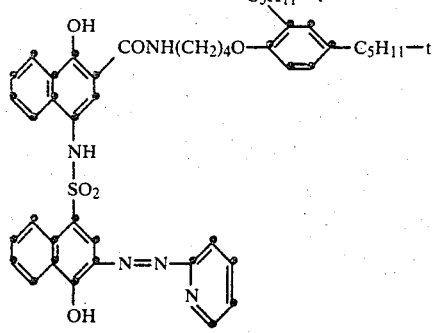
(25)

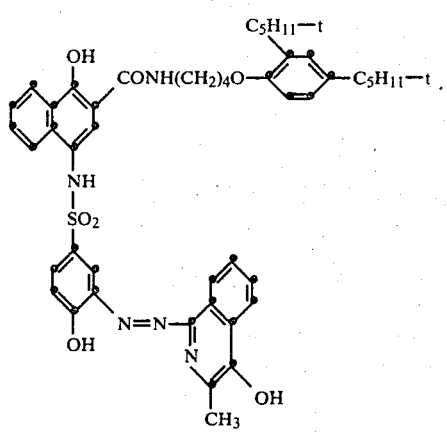
(26)

The image receiving layer comprising the mordant has associated therewith a polymer containing ligand groups which form coordination complexes with metal ions such that the stability constant of a complex of the polymer and metal ions is at least $10^{10}$. The polymers which coordinate with the metal ions preferably form chelates with the metal ions. Polymers which form chelates with metal ions can contain ligand coordinating groups such as iminodiacetic acid, iminobis(cyanomethyl), o-hydroxybenzaldehyde, iminobis(phosphonomethyl), β-diketone, β-ketoester and bipyridyl groups. Other coordinating groups useful herein are cyclic amines, primary, secondary and tertiary amines, tertiary phosphines, mercaptans, thioureas, alcohols, ethers and the like. Exemplary chelating groups are iminodiacetic acid, ethylene diamine tetraacetic acid, o-hydroxybenzaldehyde, o-hydroxybenzoic acid, bipyridyl, iminobis(cyanomethyl) and the like.

Polymers containing such coordinating groups include those containing the repeating units

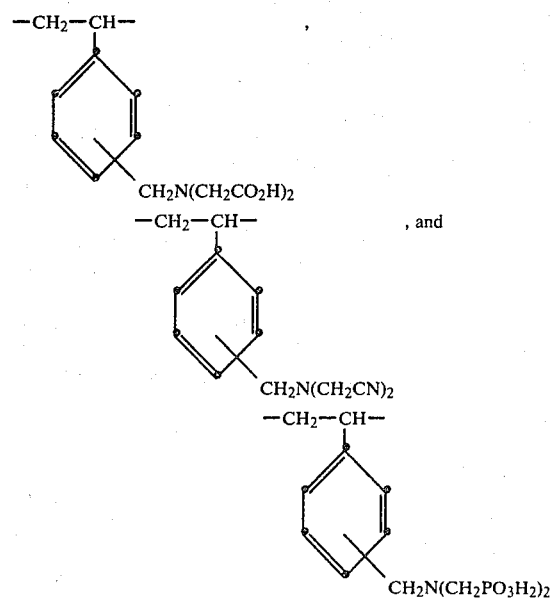

o-hydroxy-aldehyde polymers such as poly((N-vinylbenzyl-N,N-dimethyl-N-(3-formyl-4-hydroxybenzyl)

ammonium chloride)) and the like; poly(vinylpyridines) such as poly(4-vinylpyridine), poly(2-vinylpyridine), poly(2-methyl-5-vinylpyridine) and the like; poly(vinylimidazoles) such as poly(N-vinylimidazole), poly(N-vinyl-2-methylimidazole), poly(N-vinyl-2-phenylimidazole) and the like; tertiary amine-containing polymers such as poly(N,N-dimethylaminoethyl methacrylate), poly(N-vinylbenzylN,N-dimethylamine) and the like; secondary amine-containing polymers such as poly(N-methyl-4-vinylaniline) and the like; primary amine-containing polymers such as poly(vinylaniline), poly(ethylene imine), poly(2-aminoethyl methacrylate) and the like; and tertiary phosphine polymers such as poly(4-vinylphenyldiphenyl phosphine) and the like.

Some particular polymers useful herein are nitrogen-containing polymers quaternized with alkylating groups having appended coordinating groups, particularly polymers having recurring units of the structure

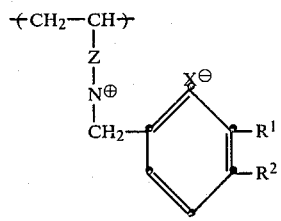

wherein $R^1$ and $R^2$ are the same or different chelating groups such as —OH, —COOH, —NHR$^4$, —NHCOR$^3$, —NHSO$_2$R$^5$, —(R$^4$=O),

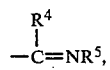

SO$_2$NHR$^4$ and the like wherein $R^3$ is alkyl of about 1 to 4 carbon atoms; $R^4$ is hydrogen or alkyl of about 1 to 4 carbon atoms; $R^5$ is alkyl of about 1 to 4 carbon atoms, aryl, or substituted aryl; Z represents the atoms necessary to complete a heterocyclic nucleus; and X is an acid anion such as chloride, bromide, iodide, methosulfate, p-toluenesulfonate, and the like.

The use of polyvinylimidazole quaternized with benzyl groups and the like with metal ions is the subject of a patent application by our coworkers Ponticello and Villard Ser. No. 025,686, filed Mar. 30, 1979. The use of soluble iminodiacetic acid polymer with metal complexes is the subject of a patent application by our coworkers Campbell, Hamilton and Brust, Ser. No. 971,620, filed Dec. 20, 1978.

A particularly preferred polymer containing groups which will coordinate with metal ions is a polymer comprising from about 5 to 100 weight percent of the recurring units having the structure

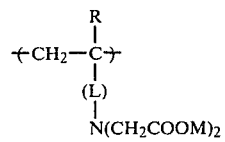

wherein:
R is H, halogen such as chloro, iodo or bromo or an alkyl group containing from 1 to 6 carbon atoms such as methyl, ethyl, propyl, isobutyl, hexyl and the like;

L is a bivalent linking group between the carbon and nitrogen atoms selected from the group consisting of alkylene of about 1 to 6 carbon atoms such as methylene, ethylene, trimethylene, propylene, tetramethylene, etc.; arylene of about 6 to 10 carbon atoms such as o-, m-, or p-phenylene, 1,4-naphthylene, arylenealkylene of about 7 to 12 carbon atoms such as phenylenemethylene, phenylenethylene, etc.; —COOR— and —CONHR— where R is alkylene, arylene, or arylenealkylene as defined above, e.g. carbonyloxyethylene, carbonyliminoethylene and the like.

M is selected from the group consisting of H, an ammonium cation such as ammonium, tetramethylammonium, pyridinium, triethylammonium and the like or an alkali metal such as potassium, sodium, lithium and the like.

The corresponding metal coordinate has the structure

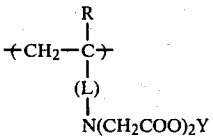

wherein Y represents metals such as nickel and copper and the like and R and L are as described above.

The polymers having this structure can be prepared by merely polymerizing the monomer prepared as described in Morris et al, J.A.C.S., 81, 377 (1959) and further described in following examples.

Another class of polymers of the invention having ligand groups which coordinate with metal ions are active methylene group-containing polymers (having pendant

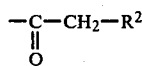

groups wherein $R^2$ is cyano or another electron-withdrawing substituent such as

wherein $R^3$ is alkyl, alkoxy, aryloxy, aryl or aralkyl). Polymers containing these groups are described in U.S. Pat. Nos. 3,459,790, 3,488,708, 3.554,987, 3,658,878, 3,929,482, 3,939,130, 2,865,893, 2,860,986 and 2,904,539.

Another useful class of polymers of the invention which coordinate with metal ions contain tertiary amine groups such as derived from vinylpyridine and vinylimidazole which use is described by D. P. Brust in U.S. patent application Ser. No. 003,169, filed Jan. 15, 1979.

Any polymerizable monomers containing the above metal ion-coordinating groups can be copolymerized with other ethylenically unsaturated monomers such as styrene, acrylic and methacrylic esters such as methyl acrylate and butyl methacrylate and amides such as acrylamide or monomers derived from a sulfoalkyl acrylic ester or amide such as described in U.S. Pat. Nos. 3,024,222, 2,923,734, 3,411,911, 3,506,707, 3,277,056, 3,525,768 and 3,547,899, 0 to 60, preferably 0 to 40 weight percent of monomers having groups capable of mordanting photographic dyes, particularly monomers comprising pendant tertiary or quaternary nitrogen groups such as those found in the mordants described in U.S. Pat. Nos. 3,958,995, 3,898,088, 3,758,445, 3,709,690, 3,788,855, 3,962,529, 3,625,694, 3,868,252, 3,557,066, 3,488,706 and *Research Disclosure* 12045 (vinylimidazolium salts) and 0 to 5, preferably less than about 2 weight percent of a divinyl monomer which effect crosslinking during polymerization such as divinylbenzene and ethylene dimethacrylate.

In preferred embodiments, the polymers can comprise from about 0 to 90 weight percent of the polymerized other ethylenically unsaturated monomers and preferably from 0 to 50 weight percent of the polymerized other ethylenically unsaturated monomers.

Metal ions useful in this invention are those which react speedily with the released dye or dye forming material to form a complex of the desired hue and form a dye complex which is stable to heat, light and chemical reagents. Good results can be obtained with polyvalent metal ions such as copper(II), zinc(II), nickel(II), platinum(II), palladium(II) and cobalt(II) ions. Most preferred are the transition metal ions and especially preferred are nickel(II) and copper(II).

The metal ions which are coordinated to the polymer can be derived from any source of metal ions such as a solution of a salt of the metal ions in water or a solvent such as methanol, ethanol, N,N-dimethylformamide and the like. Preferred sources of metal ions are water soluble salts such as water soluble nickel chloride, sulfate, nitrate or acetate and water soluble copper chloride, sulfate, nitrate and acetate and the like.

The term "coordinate to" as used herein refers to materials which are capable of sharing electron pairs with electrophilic, cationic metal atoms. The stability constant for the complex of a polymer and the metal ion is determined by measuring the concentration of polymer ligand-metal complex, free polymer ligand and free metal ion at a pH of about 5 or higher and by applying the equations:

$$M + L = ML \quad \beta_1 = \frac{[ML]}{[M][L]}$$

$$M + 2L = ML_2 \quad \beta_2 = \frac{[ML_2]}{[M][L]^2}$$

$$M + 3L = ML_3 \quad \beta_3 = \frac{[ML_3]}{[M][L]^3}$$

$$\cdot \quad \cdot \quad \cdot$$
$$\cdot \quad \cdot \quad \cdot$$
$$\cdot \quad \cdot \quad \cdot$$

$$M + NL = ML_N \quad \beta_N = \frac{[ML_N]}{[M][L]^N}$$

where
M is a metal ion,
L is the concentration of the polymer ligand, and
$\beta$ is the overall stability constant as described in F. A. Cotton and G. Wilkinson, *Advanced Inorganic Chemistry*, Interscience, New York, 1967. The stability constant for a complex of a particular metal ion with a particular polymer containing coordinating groups can be found by quantifying the species mentioned above. In order to be effective, the stability constant of the polymer and metal ion complex must be at least $10^{10}$ and preferably at least $10^{15}$.

The metal ions and polymer can form a coordination complex by adding both into a vessel. The coordination reaction will proceed at any temperature and pressure and without the aid of a catalyst. The polymer-metal coordination complex, if soluble, can then be coated as a single layer on a photographic element in any conventional coating manner such as coating in a solvent or water with a mordant to form an image receiving layer or the source of metal ions can be coated in an adjacent (either next adjacent or in a further layer with easy access) layer to the polymer containing layer. The diffusing metal ions will coordinate to the polymer and will be prevented from wandering past the polymer containing layer. If the coordinated polymer-metal complex is insoluble, layers thereof are preferably prepared by first coating a solution of a soluble salt of the metal, then overcoating with a solution or dispersion of the polymer. While wet, the metal migrates to the polymer to form the insoluble complex in situ.

The metal to mordant ratio is generally from $\sim$1:2 to $\sim$1:50 and preferably $\sim$1:5 to 1:20.

It is noted that the metal ions need only be associated with the mordant layer and the polymer containing the coordinating groups. By "associated with" it is meant that the metal ions can be coated either in the same layer with the mordant and polymer containing coordinating groups or coated in an adjacent layer which can be either next adjacent or in a layer separated by one or more layers so long as the metal ions are coordinated with the polymer prior to the diffusion of the dye ligand or dye ligand forming material to the mordant. However, the metal ions are either in the same layer as, or on the side of, the image receiving layer opposite to the side nearest the imaging layers (i.e., those layers containing the dye ligands or dye ligand forming materials). If the metal ions are located between the image receiving layer and the imaging layer, they can diffuse to the imaging layers causing severe image discrepancies. If the polymer containing coordinating groups is in a layer other than the layer containing the mordant, the diffusing dye ligand must then form a more stable coordination complex or chelate with the metal than does the polymer in order for the dye to be metallized by the polymer-metal ion complex.

In a preferred embodiment, the photographic element containing the mordant layer, polymer with coordinating groups and metal ions is a dye image receiving element designed for use in an image transfer process.

An image transfer film unit of the invention can thus comprise:

(1) a support having thereon at least one layer containing a photosensitive silver halide emulsion having associated therewith a chelatable dye or dye forming material;

(2) a dye image receiving layer; and (3) an alkaline processing composition and means of discharging the same within said film unit in contact with said photosensitive layer;

said film unit containing a silver halide developing agent, wherein the dye image receiving layer has associated therewith a polymer containing groups which form coordination complexes with metal ions and said image receiving layer has associated therewith a source of metal ions, wherein the stability constant of a complex of the polymer and the metal ions is at least $10^{10}$, but also less than the stability constant for the dye ligand-metal ion complex.

The photographic element in the above-described process can be treated with an alkaline processing composition to effect or initiate development in any manner. A preferred method for applying processing composition is by use of a rupturable container or pod which contains the composition. In general, the processing composition employed in this invention contains the developing agent for development, although the composition could also just be an alkaline solution where the developer is incorporated in the photographic element, image-receiving element or process sheet, in which case the alkaline solution serves to activate the incorporated developer.

A photographic film unit which can be processed in accordance with this invention is adapted to be processed by passing the unit between a pair of juxtaposed pressure-applying members, such as would be found in a camera designed for incamera processing, and comprises:

(1) a photographic element as described above;
(2) a dye image-receiving layer; and
(3) means for discharging an alkaline processing composition within the film unit, such as a rupturable container which is adapted to be positioned during processing of the film unit so that a compressive force applied to the container by the pressure-applying members will effect a discharge of the container's contents within the film unit;

said film unit containing a silver halide developing agent.

It will be appreciated that, after processing the photographic element described above, there remains in it after transfer has taken place an imagewise distribution of the dye ligand in addition to developed silver. A color image comprising residual nondiffusible compound may be obtained in this element if the residual silver and silver halide are removed by any conventional manner well known to those skilled in the photographic art, such as a bleach bath followed by a fix bath, a bleach-fix bath, etc. Such a retained dye image can normally be treated with metal ions to metallize the dyes to increase their light fastness and shift their spectral absorption to the intended region.

In the processes described herein, the dye imagereceiving layer may itself contain metal ions or the metal ions may be present in an adjacent layer on the side of the dye image receiving layer farthest from the layers containing dye or dye forming materials, so that the dye ligand or dye ligand forming materials which is released will form a coordination complex therewith. The dye thus becomes immobilized in the dye image-receiving layer and metallized at the same time. The formation of the coordination complex may shift the absorption of the dye to the desired hue, usually to longer wavelengths, which have a different absorption than that of the initial dye-releasing compound. If this shift is large enough, then the dye-releasing compound may be incorporated in a silver halide emulsion layer without adversely affecting its sensitivity.

It is noted that a hue shift can also be obtained by blocking chelating groups of the dyes. For instance, if OH is the chelating group, the group can be blocked with acetate or other blocking groups to form a hydrolyzable precursor. On development, the dye is hydrolyzed and the hue shifts.

The dye image-receiving layer in the above-described film unit can be located on a separate support adapted to be superposed on the photographic element after exposure thereof. Such image-receiving elements are generally disclosed, for example, in U.S. Pat. No. 3,362,819. When the means for discharging the processing composition is a rupturable container, it is usually positioned in relation to the photographic element and the image-receiving element so that a compressive force applied to the container by pressure-applying members, such as would be found in a typical camera used for in-camera processing, will effect a discharge of the container's contents between the image-receiving element and the outermost layer of the photographic element. After processing, the dye imagereceiving element is separated from the photographic element.

The dye image-receiving layer in the above-described film unit can also be located integral with the photographic element between the support and the lowermost photosensitive silver halide emulsion layer. One useful format for integral receiver-negative photographic elements is disclosed in Belgian Pat. No. 757,960. In such an embodiment, the support for the photographic element is transparent and is coated with an image-receiving layer, a substantially opaque light-reflective layer, e.g., $TiO_2$, and then the photosensitive layer or layers described above. After exposure of the photographic element, a rupturable container containing an alkaline processing composition and an opaque process sheet are brought into superposed position. Pressure-applying members in the camera rupture the container and spread processing composition between the photographic element and an opaque cover sheet as the film unit is withdrawn from the camera. The processing composition develops each exposed silver halide emulsion layer and dye images are formed as a function of development which diffuse to the image-receiving layer to provide a positive, right-reading image which is viewed through the transparent support on the opaque reflecting layer background. For other details concerning the format of this particular integral film unit, reference is made to the above-mentioned Belgian Pat. No. 757,960.

Another format for integral negative-receiver photographic elements in which the present invention can be employed is disclosed in Belgian Pat. No. 757,959. In this embodiment, the support for the photographic element is transparent and is coated with the image-receiving layer, a substantially opaque, light-reflective layer and the photosensitive layer or layers described above. A rupturable container containing an alkaline processing composition and an opacifier is positioned adjacent the top layer and a transparent top sheet which has thereon a neutralizing layer and a timing layer. The film unit is placed in a camera, exposed through the transparent top sheet and then passed through a pair of pressure-applying members in the camera as it is being removed therefrom. The pressure-applying members rupture the container and spread processing composition and opacifier over the negative portion of the film unit to render it light-insensitive. The processing composition develops each silver halide layer and dye images are formed as a result of development which diffuse to the image-receiving layer to provide a positive, right-reading image which is viewed through the transparent support on the opaque reflecting layer background. For further details concerning the format of this particular integral film unit, reference is made to the above-mentioned Belgian Pat. No. 757,959.

Still other useful integral formats in which this invention can be employed are described in U.S. Pat. Nos. 3,415,644; 3,415,645; 3,415,646; 3,647,437; and 3,635,707. In most of these formats, a photosensitive silver halide emulsion is coated on an opaque support and a dye imagereceiving layer is located on a separate transparent support superposed over the layer outermost from the opaque support. In addition, this transparent support also preferably contains a neutralizing layer and a timing layer underneath the dye image-receiving layer.

Another embodiment of the invention uses the image-reversing technique disclosed in British Pat. No. 904,364, page 19, lines 1 through 41. In this process, the dyereleasing compounds are used in combination with physical development nuclei in a nuclei layer contiguous to the photosensitive silver halide negative emulsion layer. The film unit contains a silver halide solvent, preferably in a rupturable container with the alkaline processing composition.

The film unit or assembly used in the present invention may be used to produce positive images in single- or multicolors. In a preferred three-color system, each silver halide emulsion layer of the film assembly will have associated therewith a dye forming compound which releases a dye ligand which, in its metallized form, poasesses a predominant spectral absorption within the region of the visible spectrum to which said silver halide emulsion is sensitive (initially or after forming the coordination complex), i.e., the bluesensitive silver halide emulsion layer will have a yellow dye forming material associated therewith, the green-sensitive silver halide emulsion layer will have a magenta dye forming material associated therewith, and the red-sensitive silver halide emulsion layer will have a cyan dye forming material associated therewith, at least one of the dye or dye forming materials being a compound in accordance with the present invention. The dye forming material associated with each silver halide emulsion layer may be contained either in the silver halide emulsion layer itself or in a layer contiguous to the silver halide emulsion layer.

The concentration of dye or dye forming compounds that can be employed in the present invention may be varied over a wide range, depending upon the particular compound employed and the results which are desired. For example, dyes or dye formers may be coated in layers by using coating solutions containing between about 0.5 and about 8 percent by weight of the dye or dye former distributed in a hydrophilic film-forming natural material or synthetic polymer, such as gelatin, poly(vinyl alcohol), etc., which is adapted to be permeated by aqueous alkaline processing composition.

Depending upon which CAR is used in the dye-releasing compound a variety of silver halides developing agents can be employed. In certain embodiments of the invention, any silver halide developing agent can be employed as long as it cross-oxidizes with the dye-releasers described herein. The developer may be employed in the photosensitive element to be activated by the alkaline processing composition. Specific examples of developers which can be employed in this invention include:
N-methylaminophenol
Phenidone (1-phenyl-3-pyrazolidone)
Dimezone (1-phenyl-4,4-dimethyl-3-pyrazolidone) aminophenols
1-phenyl-4-methyl-4-hydroxymethyl-3-pyrazolidone
N,N-diethyl-p-phenylenediamine
N,N,N',N'-tetramethyl-p-phenylenediamine
3-methyl-N,N-diethyl-p-phenylenediamine
3-methoxy-N-ethyl-N-ethoxy-p-phenylenediamine, etc.
The non-chromogenic developers in this list are preferred, however, since they avoid any propensity of staining the dye image-receiving layer.

In one of the preferred embodiments of the invention, the silver halide developer employed in the process becomes oxidized upon development and reduces silver halide to silver metal. The oxidized developer then cross-oxidizes the dye-releasing compound. The product of cross-oxidation then undergoes alkaline hydrolysis, thus releasing an imagewise distribution of diffusible azo dye which then diffuses to the receiving layer to provide the dye image. The diffusible moiety is transferable in alkaline processing composition either by virtue of its self-diffusivity or by having attached to it one or more solubilizing groups, for example, a carboxy, sulpho, sulphonamido, hydroxy or morpholino group.

In using dye-releasing compounds which produce diffusible dye images as a function of development, either conventional negative-working or direct-positive silver halide emulsions may be employed. If the silver halide emulsion employed is a direct-positive silver halide emulsion, such as an unfogged, internal-image emulsion designed for use in the internal image reversal process or a fogged, direct-positive emulsion such as a solarizing emulsion, which is developable in unexposed areas, a positive image can be obtained in certain embodiments on the dye image-receiving layer. After exposure of the film unit, the alkaline processing composition permeates the various layers to initiate development of the exposed photosensitive silver halide emulsion layers. The developing agent present in the film unit develops each of the silver halide emulsion layers in the unexposed areas (since the silver halide emulsions are direct-positive ones), thus causing the developing agent to become oxidized imagewise corresponding to the unexposed areas of the direct-positive silver halide emulsion layers. The oxidized developing agent then cross-oxidizes the dye-releasing compounds and the oxidized form of the compounds then undergoes a base-catalyzed reaction to release the dyes imagewise as a function of the imagewise exposure of each of the silver halide emulsion layers. At least a portion of the imagewise distributions of diffusible dyes diffuse to the image-receiving layer to form a positive image of the original subject. After bing contacted by the alkaline processing composition, a pH-lowering layer in the film unit or image-receiving unit lowers the pH of the film unit or image receiver to stabilize the image.

Internal-image silver halide emulsions useful in this invention are described more fully in the November 1976 edition of *Research Disclosure*, pages 76 through 79, the disclosure of which is hereby incorporated by reference.

The various silver halide emulsion layers of a color film assembly employed in this invention can be disposed in the usual order, i.e., the blue-sensitive silver halide emulsion layer first with respect to the exposure side, followed by the green-sensitive and red-sensitive silver halide emulsion layers. If desired, a yellow dye layer or a yellow colloidal silver layer can be present between the blue-sensitive and green-sensitive silver halide emulsion layers for absorbing or filtering blue radiation that may be transmitted through the blue-sensitive layer. If desired, the selectively sensitized silver halide emulsion layers can be disposed in a different order, e.g., the blue-sensitive layer first with respect to the exposure side, followed by the red-sensitive and green-sensitive layers.

The rupturable container employed in certain embodiments of this invention can be of the type disclosed in U.S. Pat. Nos. 2,543,181; 2,643,886; 2,653,732; 2,723,051; 3,056,492; 3,056,491 and 3,152,515. In general, such containers comprise a rectangular sheet of fluid- and air-impervious material folded longitudinally upon itself to form two walls which are sealed to one another along their longitudinal and end margins to form a cavity in which processing solution is contained.

Generally speaking, except where noted otherwise, the silver halide emulsion layers employed in the invention comprise photosensitive silver halide dispersed in gelatin and are about 0.6 to 6 microns in thickness; the dye or dye formers are dispersed in an aqueous alkaline solution-permeable polymeric binder, such as gelatin, as a separate layer about 0.2 to 7 microns in thickness; and the alkaline solution-permeable polymeric interlayers, e.g., gelatin, are about 0.2 to 5 microns in thickness. Of course, these thicknesses are approximate only and can be modified according to the product desired.

Scavengers for oxidized developing agent can be employed in various interlayers of the photographic elements of the invention. Suitable materials are disclosed on page 83 of the November 1976 edition of *Research Disclosure*, the disclosure of which is hereby incorporated by reference.

Use of a pH-lowering material in the film units employed in this invention will usually increase the stability of the transferred image. Generally, the pH-lowering material will effect a reduction in the pH of the image layer from about 13 or 14 to at least 11 and preferably 5 to 8 within a short time after imbibition. Suitable materials and their functioning are disclosed on pages 22 and 23 of the July 1974 edition of *Research Disclosure* and pages 35 through 37 of the July 1975 edition of *Research Disclosure*, the disclosures of which are hereby incorporated by reference.

A timing or inert spacer layer can be employed in the practice of this invention over the pH-lowering layer which "times" or controls the pH reduction as a function of the rate at which alkali diffuses through the inert spacer layer. Examples of such timing layers and their functioning are disclosed in the *Research Disclosure* articles mentioned in the paragraph above concerning pH-lowering layers.

The alkaline processing composition employed in this invention is the conventional aqueous solution of an alkaline material, e.g., alkali metal hydroxides or carbonates such as sodium hydroxide, sodium carbonate or an amine such as diethylamine, preferably processing at a pH in excess of 11, and preferably containing a developing agent as described previously. Suitable materials and addenda frequently added to such compositions are disclosed on pages 79 and 80 of the November 1976 edition of *Research Disclosure*, the disclosure of which is hereby incorporated by reference.

While the alkaline processing composition used in this invention can be employed in a rupturable container, as described previously, to conveniently facilitate the introduction of processing composition into the film unit, other methods of inserting processing composition into the film unit could also be employed, e.g., interjecting processing solution with communicating members similar to hypodermic syringes which are attached either to a camera or camera cartridge. The processing composition may also be applied by means of a swab or by dipping in a bath, if so desired.

The alkaline solution-permeable, substantially opaque, light-reflective layer employed in certain embodiments of photographic film units used in this invention are described more fully in the November 1976 edition of *Research Disclosure*, page 82, the disclosure of which is hereby incorporated by reference.

The supports for the photographic elements used in this invention can be any material as long as it does not deleteriously affect the photographic properties of the film unit and is dimensionally stable. Typical flexible sheet materials are described on page 85 of the November 1976 edition of *Research Disclosure*, the disclosure of which is hereby incorporated by reference.

While the invention has been described with reference to layers of silver halide emulsions and dye image-providing materials, dotwise coating, such as would be obtained using a gravure printing technique, could also be employed. In this technique, small dots of blue-, green- and red-sensitive emulsions have associated therewith, respectively, dots of yellow, magenta and cyan color-providing substances. After development, the transferred dyes would tend to fuse together into a continuous tone.

The silver halide emulsions useful in this invention, both negative-working and direct-positive ones, are well known to those skilled in the art and are described in *Product Licensing Index*, Volume 92, December 1971, publication 9232, page 107, paragraph I, "Emulsion types"; they may be chemically and spectrally sensitized as described on page 107, paragraph III, "Chemical sensitization", and pages 108 and 109, paragraph XV, "Spectral sensitization", of the above article; they can be protected against the production of fog and can be stabilized against loss of sensitivity during keeping by employing the materials described on page 107, paragraph V, "Antifoggants and stabilizers", of the above article; they can contain development modifiers, hardeners, and coating aids as described on pages 107 and 108, paragraph IV, "Development modifiers"; paragraph VII, "Hardeners"; and paragraph XII, "Coating aids", of the above article; they and other layers in the photographic elements used in this invention can contain plasticizers, vehicles and filter dyes described on page 108, paragraph XI, "Plasticizers and lubricants", and paragraph VIII, "Vehicles", and page 109, paragraph XVI, "Absorbing and filter dyes", of the above article; they and other layers in the photographic elements used in this invention may contain addenda which are incorporated by using the procedures described on page 109, paragraph XVII, "Methods of addition", of the above article; and they can be coated by using the various techniques described on page 109, paragraph XVIII, "Coating procedures", of the above article, the disclosures of which are hereby incorporated by reference.

The term "nondiffusing" used herein has the meaning commonly applied to the term in photography and denotes materials that for all practical purposes do not migrate nor wander through organic colloid layers such as gelatin in an alkaline medium, in the photographic elements of the invention and preferably when processed in a medium having a pH of 11 or greater. The same meaning is to be attached to the term "immobile". The term "diffusible" as applied to the materials of this invention has the converse meaning and denotes materials having the property of diffusing effectively through the colloid layers of the photographic elements in an alkaline medium in the presence of "nondiffusing" materials. "Mobile" has the same meaning.

In the preferred embodiment, the film unit is an integral film unit wherein the receiver, dye forming layer and cover sheet are permanently attached to one another before, during and after processing.

The following examples are presented for a further understanding of the invention.

EXAMPLE 1

Poly(N-vinylbenzyliminodiacetic acid disodium salt)

A slurry of 100 g of N-vinylbenzyliminodiacetic acid in 1 l of water was adjusted to pH 5.5 by the addition of 50% sodium hydroxide solution. The resultant solution was decolorized by stirring with 1 g of activated carbon for 15 minutes. The carbon was removed by filtration and 500 mg of potassium persulfate was added. The solution was then flushed with nitrogen and heated at 60° C. overnight. The polymer solution was enclosed in cellulose bags and dialyzed against distilled water for 6 hours. Freeze drying the dialysate gave 100 g of product.

Anal. calcd. for $C_{13}H_{13}NO_4Na$: C, 57.8; H, 9.8; N, 5.2; Na, 8.5. Found: C, 56.1; H, 5.3; N, 5.2, Na, 8.2.

$[\eta]_{0.1\ N\ NaCl} = 1.63$.

EXAMPLE 2

Poly(N-vinylbenzyliminodiacetic acid disodium salt-co-sodium acrylate) $(1:1)_w$ A mixture of 30 g of acrylic acid and 30 g of N-vinylbenzyliminodiacetic acid in 500 ml of water was adjusted to pH 5.5 by the addition of 50% sodium hydroxide solution and the resultant solution was decolorized by stirring with 1 gram of activated carbon. The carbon was removed by filtration and 300 mg of potassium persulfate was added. The solution was then flushed with nitrogen and heated at 60° C. overnight. The polymer solution was enclosed in cellulose bags and dialyzed for 6 hours. Freeze drying gave 58 g of product.

EXAMPLE 3

Poly(N-vinylbenzyliminodiacetic acid-co-4-vinylpyridine) $(1:1)_w$

A slurry of 15 g of N-vinylbenzyliminodiacetic acid in 270 ml of water was adjusted to pH 5.5 by the addition of 50% sodium hydroxide solution. To the resultant solution was added 15 g of freshly distilled 4-vinylpyridine and 150 mg of potassium persulfate. The solution was then purged with $N_2$ and stirred at 60° C. overnight. A viscous solution was formed which was diluted up to one liter with water, encased in cellulose bags, and dialyzed for 24 hours. The polymer was isolated by freeze drying the dialysate. Yield = 26 g.

Anal. Found: C, 62.1; H, 5.8; N, 8.1.

$[\eta]_{0.1\ N\ NaCl} = 1.29$.

EXAMPLE 4

Poly(acrylamide-co-N-vinylbenzyliminodiacetic acid disodium salt) $(80:20)_w$

A slurry of 10 g of N-vinylbenzyliminodiacetic acid in 350 ml of water was adjusted to pH 5.5 by the addition of 50% sodium hydroxide solution. To the resultant solution was added 100 ml of ethanol, 40 g of acrylamide, and 250 mg of potassium persulfate. The reaction was then flushed with nitrogen and heated at 60° C. overnight. The viscous polymer solution was diluted with 835 ml of water, and one third was dialyzed overnight. The dialysate was freeze dried to yield 16 g of product.

Anal. Found: C, 47.1; H, 6.6; N, 14.8.

$[\eta]_{0.1\ N\ NaCl} = 1.31$.

To another one third portion of the above crude polymer solution (13.4 meq chelate sites) was added dropwise 13.4 ml of 1 N nickel(II) chloride which had been diluted to 40 ml with water. A polymeric chelate separated in the form of a dispersion. The particle size of the nickel chelate dispersion was less than $1\mu$. The dispersion was dialyzed overnight to removed uncomplexed nickel. The purified dispersion was found to contain 6.2 mg of nickel per ml of solution at 6.1% solids.

EXAMPLE 5

Poly(N-vinylbenzyliminodiacetic acid disodium salt-co-N-vinylimidazole) $(1:1)_w$ A slurry of 5.0 g of N-vinylbenzyliminodiacetic acid in 90 ml of water was adjusted to pH 5.5 by the addition of 50% sodium hydroxide solution. To the resultant solution was added 5 g of N-vinylimidazole and a solution of 50 mg of 2,2'-azobis[2-methylpropionitrile] in 5 ml of acetone. The reaction vessel was purged with nitrogen and stirred at 60° C. overnight. The viscous polymer solution was then diluted with 250 ml of water and dialyzed overnight. Freeze drying gave 9 g of product.

Anal. Found: C, 54.7; H, 4.9; N, 10.8.

$[\eta]_{1\ N\ NaCl} = 1.67$.

EXAMPLE 6

Poly(sodium 2-sulfoethyl methacrylate-co-N-vinylbenzyliminodiacetic acid nickel(II) chelate) $(1:1)_w$ A slurry of 40 g of N-vinylbenzyliminodiacetic acid in 720 ml of water was adjusted to pH 5.5 by the addition of 50% sodium hydroxide solution. To the resultant solution was added 44.6 g of sodium 2-sulfoethyl methacrylate and 800 mg of potassium persulfate. The reaction vessel was purged with nitrogen and the solution was stirred at 60° C. overnight. The polymer dope was diluted with 1340 ml of water and a solution of 162 ml of 1 N nickel(II) chloride solution that had been diluted to 535 ml with water was added dropwise. A soluble, light green polymeric chelate was formed. The solution was dialyzed overnight to remove uncomplexed nickel ions and was then concentrated to 7.6% solids. It was determined by atomic absorption spectroscopy that the sample contained 7.04 mg of nickel per ml of solution.

EXAMPLE 7

Comparative Example

To evaluate the effect of mobile copper ion on dye diffusion in a simulated image transfer process, model image receiving elements, with and without copper sulfate, were prepared by coating a poly(ethylene terephthalate) film support with:

(1) a dye mordant layer comprising poly(divinylbenzene-co-styrene-co-N-benzyl-N,N-dimethyl-N- vinylbenzylammonium chloride) mordant at 200 mg/ft² (2.16 g/m²) and gelatin at 300 mg/ft² (3.24 g/m²);
(2) a white reflecting layer comprising titanium dioxide at 2200 mg/ft² (23.76 g/m²) and gelatin at 200 mg/ft² (2.38 g/m²);
(3) an overcoat layer comprising gelatin at 400 mg/ft² (4.32 g/m²).

Receiver A—as above
Receiver B—as above except that the dye mordant layer (layer 1) also contained $CuSO_4.H_2O$ at 27 mg/ft² (0.29 g/m²)

A viscous dye solution consisting of 30 ml of 0.5 N sodium hydroxide, 0.9 g of hydroxyethyl cellulose and 54 mg of 4-(2,4-dihydroxyphenylazo)-3-naphthol-1-sulfonic acid (a diffusible, metallizable magenta dye) was spread between samples of the model receivers and a processing cover sheet comprising a poly(ethylene terephthalate) film support having coated thereon:
(1) a polyacrylic acid neutralizing layer;
(2) a timing layer containing a mixture of cellulose acetate and poly(styrene-co-maleic anhydride).

The diffusion of the dye to the mordant layer was monitored by measuring the reflection density to green light as a function of time. The percent of the final $D_{max}$ at various times is expressed below for each model receiver. In addition, spectrophotometric measurements were made on the sample to determine the absorption spectrum of the dye and the effect of copper ion on absorption.

|  | % $D_{max}$ | | | | |
| --- | --- | --- | --- | --- | --- |
|  | 30 sec. | 60 sec. | 120 sec. | $D_{max}$ | $\lambda_{max}$ |
| Receiver A | 46 | 70 | 89 | 1.40 | 495 |
| Receiver B | 23 | 40 | 55 | 1.77 | 545 |

This example demonstrates that a substantial reduction in diffusion rate was observed in a receiver element containing copper sulfate. It is seen that the free copper ion was at least partially mobile in the gelatin medium, and the slower diffusion was due to the interception of the dye ligand by the copper ion which had migrated to the reflecting layer and the overcoat layer of the receiver, i.e. layers 2 and 3. Moreover, the spectrophotometric curves of the dye transferred to the samples of Receiver A and B indicate that the copper ion was successful in complexing with the dye, as shown by the shift of the maximum absorption ($\lambda_{max}$) from 495 to 545 and the increase in $D_{max}$ from 1.40 to 1.77. Further evidence of metallization was obtained by dipping the sample of Receiver A containing the dye in a solution of copper sulfate to produce a spectrophotometric curve similar to that produced in Receiver B.

EXAMPLE 8

Immobilization of Copper Ion

Image receiving elements containing the polymer synthesized in Example 1 were prepared according to the following schematic structures (quantities are stated in mg/ft² and g/m², respectively):

| Receiver C (control) | |
| --- | --- |
| Layer 3 | TiO₂ (2200; 23.76); Gelatin (220; 2.38) |
| Layer 2 | Gelatin (400; 4.32) |
| Layer 1 | Polymeric mordant of Example 7 (200; 2.16) |

| | -continued |
| --- | --- |
| | Gelatin (300; 3.24) |
| | Poly(ethylene terephthalate) |
| Receiver D (control) | |
| Layer 3 | TiO₂ (2200; 23.76); Gelatin (220; 2.38) |
| Layer 2 | Polymer of Example 1 (64; 0.69); CuSO₄ . H₂O (27; 0.29)* Gelatin (400; 4.32) |
| Layer 1 | Polymeric mordant of Example 7 (200; 2.16) Gelatin (300; 3.24) Poly(ethylene terephthalate) |
| Receiver E | |
| Layer 3 | Polymer as Example 1 (64; 0.69); CuSO₄ . H₂O (27; 0.29)* Gelatin (400; 4.32) |
| Layer 2 | TiO₂ (2200; 23.76); Gelatin (220; 2.38) |
| Layer 1 | Polymeric mordant of Example 7 (200; 2.16) Gelatin (300; 3.24) Poly(ethylene terephthalate) |

*The CuSO₄ . H₂O was coated in a separate step on top of the wet polymer (Example 1) layer.

Samples of each receiving element were treated with a viscous dye solution and the diffusion of the dye was monitored as described in Example 7. The following results were obtained:

|  | % $D_{max}$ | | | | |
| --- | --- | --- | --- | --- | --- |
|  | 30 sec. | 60 sec. | 120 sec. | $D_{max}$ | $\lambda_{max}$ |
| Receiver C | 59 | 82 | 98 | 1.44 | 495 |
| Receiver D | 54 | 71 | 79 | 1.75 | 545 |
| Receiver E | 8 | 17 | 36 | 1.78 | 545 |

From the above data, it is apparent that the immobilization of copper ion by complexation with a polymer according to this invention (Receiver E) resulted in considerable reduction of the dye diffusion rate as compared to Receivers C and O. When the polymer-copper complex was brought to the top of the receiver structure (Receiver E), very low diffusion rates were observed, indicating poor diffusion of the chelated dye through the relatively thick titanium dioxide reflecting layer. The data further illustrates that the polymer was effective in giving up the copper ion to complex with the dye presumably via a ligand exchange ($\lambda_{max}$ shifted from 495 to 545 and $D_{max}$ was increased).

EXAMPLE 9

Poly(1-vinylimidazole)-co-(1-vinyl-3-benzylimidazolium chloride)-co-[1-vinyl-3-(3-aceto-4-hydroxybenzyl)imidazolium chloride]

Poly(1-vinylimidazole) ($10^{-1}$ mole, 9.4 g) was dissolved in methanol (400 ml) and reacted with 3-aceto-4-hydroxybenzyl chloride ($2.5 \times 10^{-2}$ mole, 4.6 g) for 6 hours at the reflux temperature of the mixture. Benzyl chloride ($7.5 \times 10^{-2}$ mole, 9.5 g) was then added and the reaction mixture was left refluxing for another 2 days. The solvent was evaporated down to about 200 ml and the mixture was precipitated into ethyl acetate. The solid was filtered off and dried under vacuum to give about 16 g of a slightly yellow solid.

The resulting poly[1-vinylimidazole-co-1-vinyl-3-benzylimidazolium chloride-co-1-vinyl-3-(3-aceto-4-hydroxybenzyl)imidazolium chloride] (9.4 g) was dissolved in water (800 ml) and copper(II) ethylenediamine chloride (3 g) in water (100 ml) was added dropwise. The mixture was left stirring for 30 minutes and then "diafiltered" using a UM2 "Diaflo" membrane at 50 psi. The residue was freeze-dried to give about 12 g of the final product.

The metallized polymer (1.39 g) was dissolved in demineralized water (39.75 ml), 10% aqueous gelatin (6.25 ml), 10% aqueous p-nonylphenoxypolyglycidol (1.5 ml) and 30% methanolic 1,4-butanediol diglycidyl ether (2.5 ml) were added. The mixture was coated onto 0.007 inch thick subbed poly(ethylene terephthalate) transparent film base. During coating, the coating support was held horizontally on a flat bed and the coating mixture was spread over the support using a 0.009 inch undercut blade, giving a coating laydown of about 12 ml/sq. ft. Coatings were hardened at 46° C. for 7 days.

Strips of the coating were dyed by dipping into a 0.1 weight percent solution of 3-(2-hydroxy-1-naphthylazo)-4-hydroxybenzenesulphonamide dye in 0.1 N NaOH. The strips were left in the solution long enough (usually 2 minutes) to give a maximum dye optical density of about 2. The strips were then washed with demineralized water and dried at room temperature.

Sample strips of the coating were also dyed by laminating to coatings of the above dye in gelatin (prepared as described below) using a thickened alkaline processing solution (40 g/l NaOH, 28 g/l hydroxyethyl cellulose). The laminates were peeled apart after 5 minutes and the separated layers washed in demineralized water and dried.

The light stability of the above dyed strips was considerably improved compared with similar control strips containing unmetallized mordant.

The dye in gelatin was coated to give a dye laydown of 25 mg/ft$^2$. The dye dispersion was prepared by mixing a solution of the dye (1 g) in cyclohexanone (25 ml) and dimethylformamide (10 ml) with a 4.2% aqueous gelatin solution (378 g) containing the surfactant isopropylnaphthalenesulphonate (1 g). The mixture was agitated ultrasonically and finally diluted with water to 400 ml.

EXAMPLE 10

Reaction of latex containing reactive pendant groups with chelating reagents

Part A—Preparation of reactive latex

To a 2-liter, 4-neck flask was charged 1000 ml of distilled water. The water was heated to 90° C. and stirred under a nitrogen purge for 20 minutes, then cooled to 60° C. To the water was added 6.0 g of Triton X-100, 10.0 g of sodium styrenesulfonate, 189 g of vinylbenzyl chloride and 1.0 g of divinylbenzene. The mixture was stirred rapidly under nitrogen for 10 minutes, after which 2.0 g of $(NH_4)_2S_2O_8$ was added. Stirring was continued for 4 hours at 60° C., after which an additional 0.5 g of $(NH_4)_2S_2O_8$ and 0.3 g of $Na_2S_2O_5$ were added and the temperature increased to 90° C. for 1.5 hours. After cooling, the latex was filtered and dialyzed against distilled water.

Part B—Reaction of reactive latex with chelating group

A 100 g sample of poly(vinylbenzyl chloride-co-divinylbenzene-co-sodium styrenesulfonate) (weight ratio 94.5/0.5/5) from Part A was treated with one equivalent (based upon vinylbenzyl chloride) of disodium iminodiacetic acid dissolved in 75 ml of water. The mixture was stirred for 48 hours at pH=10, then dialyzed against distilled water for 6 hours.

Part C—Metallization of chelating index

To a 50 g sample of the material prepared in Part B was added a solution of 12.3 g of $Ni(NO_3)_2.6H_2O$ in 25 ml of water. The mixture was stirred for 1 hour, then dialyzed for 18 hours against distilled water.

EXAMPLE 11

Preparation of core-shell, chelating particles with β-diester chelating groups

Part A

To a 104 g sample of 9.6% poly(divinylbenzene-co-styrene-co-N-benzyl-N,N-dimethyl-N-vinylbenzylammonium chloride) was added 1.0 g of bis(methacryloyloxyethyl)malonate. The mixture was stirred for 6 hours under nitrogen after which 1 ml of 10% ammonium persulfate solution $(NH_2)_2S_2O_8$ was added and the mixture stirred for 24 hours at 60° C. under nitrogen.

Part B—Metallization of particles prepared in A above

A sample of material prepared in A was adjusted to pH=10–10.5 with 0.25 N NaOH then treated with 1.5 equivalents (based upon β-diester) of cupric acetate as a 10% aqueous solution. The sample was then dialyzed for 8 hours against distilled water to a pH=6–6.5. After filtration the pH was readjusted to 10–10.5 with 0.25 N NaOH.

Other chelating monomers applicable to Example 10 include unsaturated compounds containing:

β-Ketoesters such as 2-acetoacetoxyethyl methacrylate

β-Diketones such as 6-(m- and p-vinylphenyl)-2,4-hexanedione

Dicarboxylic acids such as m- and p-vinylbenzyliminodiacetic acid

Phosphites such as 4-(methacryloyloxymethyl)-2,6,7-trioxa-1-phosphabicyclo[2,2,2]octane

EXAMPLE 12

Preparation of receiving layers

A. Mordant Composition

Solutions A and B were prepared as follows:

| Solution A | | Solution B | |
|---|---|---|---|
| Poly(4-vinylpyridine) | 220 g | Pigskin gelatin | 69 g |
| Distilled water | 2015 ml | Distilled water | 1500 ml |
| Lactic acid | 65 g | pH | 5.0 |

Solution A (732 g) was added to Solution B, combined with Surfactant 10 G (10 percent by weight, 21 ml) and the mixture was diluted to a total volume of 2.55 liters (pH 4.1).

B. Nickel Salt Composition

The following solutions were prepared at 40° C.

| Solution C | | Solution D | |
|---|---|---|---|
| Pigskin gelatin | 48 g | $NiSO_4 . 6H_2O$ | 12.9 g |
| Distilled water | 1200 ml | Surfactant 10G (10% by weight) | 14.0 ml |

Solutions C and D were combined and diluted to 1500 g (pH 4.4).

C. Preparation of the Coating

The nickel salt composition was coated on a polyester film support at 2.15 g of gelatin/m² and 0.58 g of NiSO₄.6H₂O/m². This dried layer was overcoated with the mordant composition at 2.15 g/m² of gelatin and poly(4-vinylpyridine).

The following layers were coated over the mordant layer. All coverages (in parentheses) are in g/m², unless otherwise specified:

(1) A reflecting layer containing a commercial silica and alumina treated grade of titanium dioxide (16.1) and gelatin (2.6).
(2) An opaque layer containing carbon black (1.87) and gelatin (2.58).
(3) A layer of a magenta dye-releasing compound A* (1.08) dispersed with di-n-butyl phthalate (1.08) in gelatin (2.43).
(4) A green-sensitive internal image emulsion (2.69 Ag, 2.69 gelatin), such as described in Evans, U.S. Pat. No. 3,761,276, with fogging agents NA-16 and H-25 of Leone et al, U.S. Pat. No. 4,030,925, issued June 21, 1977, and 5-octadecylhydroquinone-2-sulfonic acid (16 g/mole Ag).
(5) A scavenger layer of gelatin (1.61) and dodecylhydroquinone (1.29).
(6) A gelatin overcoat layer.

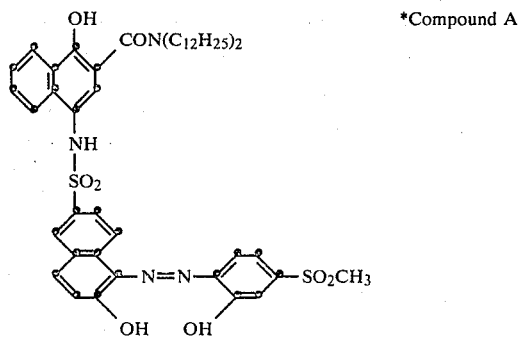

*Compound A

The image receiving element was analyzed for metallic nickel using atomic absorption spectra in order to demonstrate the immobilization of the nickel ions. The coatings were (1) examined intact, (2) with layers 2 through 6 removed, and (3) with layers 3 through 6 removed. The following Table lists the analytical results.

TABLE I

| Layers Removed | Ni g/m²* |
|---|---|
| none | 0.15 |
| 2-6 | 0.15 |
| 3-6 | 0.16 |

*Theoretical amount 0.13 g/m²

It is thus seen that little or no metal ion is diffused into the imaging layer.

EXAMPLE 13

An image receiving element was prepared by coating a transparent poly(ethyleneterephthlate)film support with:

(1) a layer containing gelatin at 1.08 g/m² and NiSO₄.6H₂O at 0.58 g/m²;
(2) a layer containing gelatin at 2.16 g/m² and a partially-quaternized polyvinyl imidazole copolymer at 3.24 g/m² having the structure:

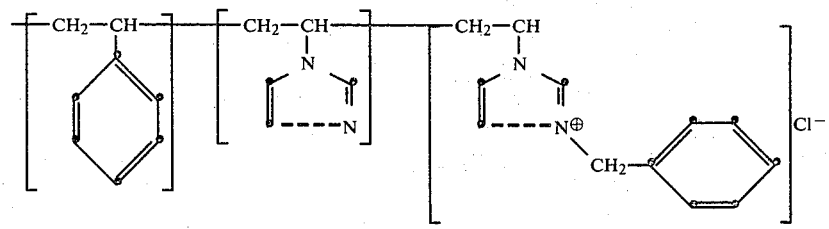

(3) a reflecting layer containing titanium dioxide at 16.2 g/m² and gelatin at 2.5 g/m²;
(4) an overcoat layer containing gelatin at 0.54 g/m² and bisvinylsulfonylmethyl ether at 2.0 weight percent of the total gelatin.

A sample of the receiver element prepared above was analyzed for nickel by x-ray fluorescence, then washed in water for 1 hour and reanalyzed. The results indicated the receiver was effective in retaining the nickel ion.

A second sample of the receiver was evaluated in a color image transfer process by laminating to an imagewise exposed, single-color photographic element and spreading a viscous processing composition therebetween.

The photographic element contained a ballasted dye-providing compound which released a metallizable magenta dye having the structure:

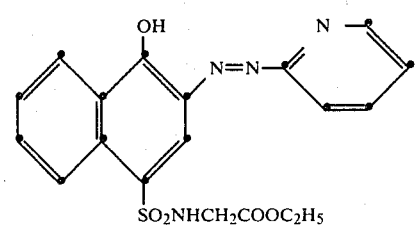

After 2 minutes, the elements were separated and the receiver was washed in water and dried to reveal a well-defined magenta dye image. From the light absorption data obtained from the dye image, it was apparent that said dye had complexed with the nickel present in the receiver.

EXAMPLE 14

Polymer in a color image transfer film unit

A series of 3 photographic single-color, integral imaging receiver elements were prepared by coating the following layers successively on a polyester film support:

(1 and 2) a receiving layer combination comprised of a mordant layer and a metal-chelating polymer layer as described below;

(3) a reflecting layer comprising titanium dioxide and gelatin;

(4) an opaque layer of carbon dispersed in gelatin;

(5) a layer comprising gelatin and a dispersion of the dye-releasing Compound B*;

(6) a layer of green-sensitive internal image emulsion, as described in Evans, U.S. Pat. No. 3,761,276 (1.35 g/m² Ag, 1.35 g/m² gelatin), with fogging agents of element 49 of Leone et al, U.S. Pat. No. 4,030,925, and 5-octadecylhydroquinone-2-sulfonic acid (16 g/mole Ag);

(7) a layer of didodecylhydroquinone (1.29 g/m²) dispersed in gelatin (1.61 g/m²); and (8) a gelatin overcoat layer.

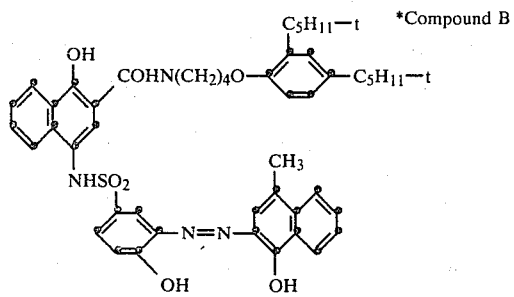

*Compound B

The 3 receiving layer combinations had varying mordant compositions.

The polymeric chelate layers comprise:

Ch: Poly(2-sulfoethyl methacrylate, sodium salt-co-N-vinylbenzyliminodiacetic acid) (50/50) (0.54 g/m²) converted to the chelate by the addition of nickel sulfate hexahydrate (1.40 g/m²).

The mordant layers comprise either a cationic mordant (CAT) or poly(4-vinylpyridine) (VP).

CAT: A mixture of poly(styrene-co-N-benzyl-N,N-dimethyl-N-vinylbenzylammonium sulfate-co-divinylbenzene) (49/49/2) and gelatin, each at 2.28 g/m².

VP: A mixture of poly(4-vinylpyridine) and gelatin, each at 2.15 g/m².

The 3 receiving layer combinations are described along with data obtained from the processed elements in the following table.

Each of these integral elements was exposed through a graduated density scale, then processed by spreading between it and a processing cover sheet (as described in Hannie and Ducharme, U.S. Pat. No. 4,061,496, issued Dec. 6, 1977) at 22° C. a viscous processing composition (as described in Hannie and Ducharme, U.S. Pat. No. 4,061,496, issued Dec. 6, 1977), by passing the transfer "sandwich" between a pair of juxtaposed rollers so that the liquid layer was about 75 μm.

The light stability was measured by exposing half of a scale-exposed and processed laminate (at least 24 hours after lamination) to a 40-day SANS (simulated average northern skylight) irradiation fading (500 footcandles) test, the other half being covered. Sensitometric curves are plotted from each half and the green optical density loss, on fading at the place on the curve where the original density is 1.0, was determined. The light stability in the experiments containing metal ion and chelating polymer is substantially improved over that of the control with no chelating polymer or metal ion.

TABLE II

| Example | Layer 1 (bottom) | Layer 2 (top) | $D_{max}$ | $D_{min}$ | Light Stability (loss on 40-day SANS) | $\lambda_{max}$ of Dye After 6 min | 24 hr |
|---|---|---|---|---|---|---|---|
| Control (no metal ion or chelating polymer) | CAT | None | 1.55 | 0.21 | −0.56 | 580 | 533 |
| 14A | Ch | CAT | 1.64 | 0.21 | −0.06 | 578 | 535 |
| 14B | Ch | VP | 2.21 | 0.26 | −0.01 | 565, 535sh | 565, 535sh |

EXAMPLE 15

Image receiving elements as identified below were prepared and tested exactly as described in Example 7:

Receiver I—Like Receiver B of Example 7 except that a well known complexing agent, the disodium salt of ethylenediaminetetraacetic acid (ETDA) was added to the coating composition so as to provide EDTA at 69 mg/ft² (0.74 g/m²) in the dye mordant layer;

Receiver II—Like Receiver B of Example 7 except that another well known metal complexing agent, 8-hydroxy-5-quinolinesulfonic acid was added so as to provide 42 mg/ft² (0.45 g/m²) in the dye mordant layer.

After testing as described in Example 7, the following diffusion data were obtained.

| Receiver | % $D_{max}$ 30" | 60" | 120" | $D_{max}$ |
|---|---|---|---|---|
| A (Example 7) | 46 | 70 | 89 | 1.40 |
| B (Example 7) | 23 | 40 | 55 | 1.77 |
| I | 7 | 17 | 36 | 1.78 |
| II | 34 | 55 | 72 | 1.48 |

It is apparent from these data that the presence of CuSO₄ (Receiver B) and the Cu/EDTA complex (Receiver I) substantially inhibit the diffusion of dye. In fact, said inhibition was substantially greater with the Cu/EDTA complex than with the uncomplexed copper. With Receiver II, (copper complexed with 8-hydroxyquinoline) an improvement in dye diffusion was observed; however, an intense yellow stain was present due to the highly colored complex. In contrast to these results, the use of the polymer containing coordinating groups as described in Example 8 resulted in no color stain and little or no dye wandering.

EXAMPLE 16

A series of polymer-containing coatings were prepared by coating poly(ethylene terephthlate) film supports as described below.

Coating 1—A two-layer coating containing (1) a first (bottom) layer comprising gelatin at 100 mg/ft² (1.08 g/m²) and nickel sulfate at 50 mg/ft² (0.63 g/m²) and (2) a top layer comprising gelatin at 200 mg/ft² (2.16 g/m²) and carboxymethyl cellulose (CMC) at 200 mg/ft² (2.16 g/m²).

Coating 2—A single-layer coating comprising gelatin at 200 mg/ft² (2.16 g/m²) and carboxymethyl cellulose at 200 mg/ft² (2.16 g/m²).

Coating 3—A single-layer coating comprising gelatin at 200 mg/ft² (2.16 g/m²) and cellulose acetate hydrogen phthalate (CA) at 200 mg/ft² (2.16 g/m²).

Coating 4—A two-layer coating containing (1) a bottom layer comprising gelatin at 100 mg/ft² (1.08 g/m²) and nickel sulfate at 58 mg/ft² (0.63 g/m²) and (2) a top layer comprising gelatin at 200 mg/ft² (2.16 g/m²) and cellulose acetate hydrogen phthalate at 200 mg/ft² (2.16 g/m²).

Coating 5—A single-layer coating comprising gelatin at 200 mg/ft² (2.16 g/m²) and poly(4-vinylpyridine-co-vinylbenzyliminodiacetic acid) (weight ratio 1:1) VBA at 325 mg/ft² (3.51 g/m²).

Coating 6—A two-layer coating containing (1) a bottom layer comprising gelatin at 100 mg/ft² (1.08 g/m²) and nickel sulfate at 54 mg/ft² (0.58 g/m²) and (2) a top layer comprising gelatin at 200 mg/ft² (2.16 g/m²) and VBA at 325 mg/ft² (3.51 g/m²).

A thin overcoat layer comprising gelatin and bis-vinylsulfonylmethyl ether at 2% by weight of the total gelatin was also applied to all coatings.

To test the retention of the nickel ion by the coated polymers, separate samples of the above-described coatings were selectively laminated to different samples (as identified in the following table), and a viscous alkaline solution comprising a pH 5.0 buffer and carboxymethyl cellulose as a thickener was spread between. After 24 hours at room temperature, the samples were separated, washed, dried and then analyzed for nickel. The results are recorded in the following table.

TABLE III

| Ex. | Laminate | Ni+2 Analysis (mg/ft²) | | | |
|---|---|---|---|---|---|
| | | Coating/Analysis | | Coating/Analysis | |
| 16a | CMC + Ni (1) | CMC + Ni | 0.5 | VBA (5) | 11.5 |
| 16b | CMC (2) | CMC | 0.5 | VBA + Ni (6) | 11.1 |
| 16c | CA (3) | CA | 0.5 | VBA + Ni (6) | 10.9 |
| 16d | CA + Ni (4) | CA + Ni | 0.5 | VBA (5) | 12.6 |

These data show that the Ni is retained far more strongly by the VBA of the present invention than by either the CMC or the CA. Even when Ni is initially coated under the CMC or CA, it migrates to the VBA layer.

The invention has been described in detail with particular reference to preferred embodiments thereof, but it will be understood that variations and modifications can be effected within the spirit and scope of the invention.

What is claimed is:

1. A photographic element comprising a support having thereon at least one layer containing a photosensitive silver halide emulsion, at least one layer containing a dye mordant and at least one layer containing a dye ligand or dye ligand forming material, wherein there is present:

(a) a polymer containing groups which form coordination complexes with metal ions; and (b) metal ions, wherein the stability constant of a complex of the polymer and metal ion is at least $10^{10}$;

either in the layer containing the dye mordant or in a layer adjacent to said dye mordant layer, said dye mordant layer being located between said adjacent layer and said dye ligand or dye ligand forming material-containing layer, wherein the metal to mordant ratio is from about 1:2 to about 1:50 by weight, whereby said metal ions are prevented from wandering past said polymer-containing layer into said dye ligand or dye ligand forming material-containing layer.

2. The photographic element of claim 1 wherein the metal ions are selected from the group consisting of copper II and nickel II.

3. The photographic element of claim 1 wherein the dye ligand forming material comprises a nondiffusible compound having a releasable azo dye moiety, said compound having the following formula:

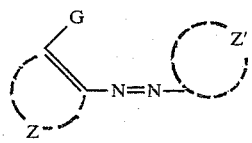

wherein:

Z represents the atoms necessary to complete an aromatic carbocyclic or heterocyclic nucleus having at least one ring of 5 to 7 atoms;

Z' is an aromatic carbocyclic or heterocyclic nucleus having at least one ring of 5 to 7 atoms, said Z' having, in a position adjacent to the point of attachment to the azo linkage, either (a) a nitrogen atom in said ring of said nucleus which acts as a chelating site, or (b) a carbon atom in said ring of said nucleus having directly attached thereto a nitrogen atom which acts as a chelating site;

G is a metal chelating group, a salt thereof or a hydrolyzable precursor thereof; said compound also containing a ballasted carrier moiety capable of releasing said diffusible azo dye as a function of development of said silver halide emulsion layer under alkaline conditions.

4. A photographic element comprising a support having thereon at least one layer containing a photosensitive silver halide emulsion, at least one layer containing a dye mordant and at least one layer containing a dye ligand or dye ligand forming material, wherein there is present either in the layer containing the dye mordant or in a layer adjacent to said dye mordant layer;

(a) a polymer comprising from about 5 to 100 weight percent of the recurring units having the structure

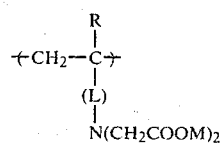

wherein R is H, halogen or an alkyl group containing from 1 to 6 carbon atoms, L is a bivalent linking group and M is selected from the group consisting of H, an ammonium cation and an alkali metal; and (b) metal ions, said dye mordant layer being located between said adjacent layer and said dye ligand or dye ligand forming material-containing layer.

5. The photographic element of claim 4 wherein the metal ions are selected from the group consisting of copper II and nickel II.

6. The photographic element of claim 5 wherein L is selected from the group consisting of phenylene, phenylenemethylene, carbonyloxyalkylene and carbonyliminoalkylene.

7. The photographic element of claim 6 wherein M is selected from the group consisting of ammonium, tetraethylammonium, sodium, potassium, and lithium.

8. A photographic element comprising a support having thereon at least one layer containing a photosensitive silver halide emulsion, at least one layer containing a dye mordant and at least one layer containing a dye ligand or dye ligand forming material, wherein there is present either in the layer containing the dye mordant or in a layer adjacent to said dye mordant layer:

a polymer comprising from about 5 to 100 weight percent of the recurring units having the structure

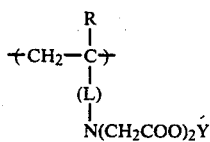

wherein R is H, halogen or an alkyl group containing from 1 to 6 carbon atoms, L is a bivalent linking group, and Y is a metal ion, said dye mordant layer being located between said adjacent layer and said dye ligand or dye ligand forming material-containing layer.

9. A photographic element comprising a support having thereon at least one layer containing a photosensitive silver halide emulsion, at least one layer containing a dye mordant and at least one layer containing a dye ligand or dye ligand forming material, wherein there is present either in the layer containing the dye mordant or in a layer adjacent to said dye mordant layer, a polymer containing groups which form coordination complexes with metal ions, said polymer having associated therewith a source of metal ions wherein the stability constant of a complex of the polymer and metal ion is at least $10^{10}$, said dye mordant layer being located between said adjacent layer and said dye ligand or dye ligand forming material-containing layer, wherein the metal to mordant ratio is from about 1:2 to about 1:50 by weight, whereby said metal ions are prevented from wandering past said polymer-containing layer into said dye ligand or dye ligand forming material-containing layer.

10. The photographic element of claim 9 wherein the metal ions are selected from the group consisting of copper II and nickel II.

11. A photographic element comprising a support having thereon at least one layer containing a photosensitive silver halide emulsion, at least one layer containing a dye mordant and at least one layer containing a dye ligand or dye ligand forming material, wherein there is present either in the layer containing the dye mordant or in a layer adjacent to said dye mordant layer:

a polymer comprising from about 5 to 100 weight percent of the recurring units having the structure

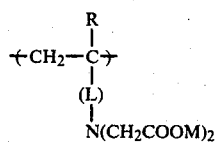

wherein R is H, halogen or an alkyl group containing from 1 to 6 carbon atoms, L is a bivalent linking group and M is selected from the group consisting of H, an ammonium cation and an alkali metal, said polymer having associated therewith a source of metal ions, said dye mordant layer being located between said adjacent layer and said dye ligand or dye ligand forming material-containing layer.

12. The photographic element of claim 11 wherein the metal ions are selected from the group consisting of copper II and nickel II.

13. A receiving element containing a support having thereon at least one layer comprising a mordant and a metallized dye, said element containing either in the mordant layer or in a layer intervening the support and mordant layer a metal complex of metal ions with a polymer comprising from about 5 to 100 weight percent of the recurring units having the structure.

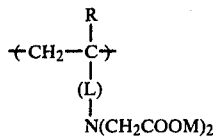

wherein R is H, halogen or an alkyl group containing from 1 to 6 carbon atoms, L is a bivalent linking group and M is selected from the group consisting of H, an ammonium cation and an alkali metal ion.

14. The receiving element of claim 13 wherein the metal ions are selected from the group consisting of copper II and nickel II.

* * * * *